(12) United States Patent
Swenson et al.

(10) Patent No.: US 8,630,512 B2
(45) Date of Patent: Jan. 14, 2014

(54) DYNAMIC CLIENT-SERVER VIDEO TILING STREAMING

(75) Inventors: Erik R. Swenson, San Jose, CA (US); Nitin Bhandari, Fremont, CA (US); Vijay Kumar, Santa Clara, CA (US)

(73) Assignee: Skyfire Labs, Inc., Mountain View, CA (US)

( * ) Notice: Subject to any disclaimer, the term of this patent is extended or adjusted under 35 U.S.C. 154(b) by 1314 days.

(21) Appl. No.: 12/020,361

(22) Filed: Jan. 25, 2008

(65) Prior Publication Data

US 2008/0181498 A1 Jul. 31, 2008

Related U.S. Application Data

(60) Provisional application No. 60/886,577, filed on Jan. 25, 2007.

(51) Int. Cl.
```
G06K 9/54      (2006.01)
G06K 9/60      (2006.01)
G06K 9/36      (2006.01)
G06K 9/46      (2006.01)
G06K 9/32      (2006.01)
```

(52) U.S. Cl.
USPC ............................ 382/305; 382/232; 382/293

(58) Field of Classification Search
USPC .......................... 382/305, 232, 282, 293, 299
See application file for complete search history.

(56) References Cited

U.S. PATENT DOCUMENTS

| | | |
|---|---|---|
| 5,708,511 A | 1/1998 | Gandhi et al. |
| 5,727,159 A | 3/1998 | Kikinis |
| 5,821,915 A | 10/1998 | Graham et al. |
| 6,008,847 A * | 12/1999 | Bauchspies .............. 375/240.01 |
| 6,038,257 A | 3/2000 | Brusewitz et al. |
| 6,266,817 B1 | 7/2001 | Chaddha |
| 6,275,534 B1 | 8/2001 | Shiojiri |
| 6,282,240 B1 | 8/2001 | Fukunaga et al. |

(Continued)

FOREIGN PATENT DOCUMENTS

| | | |
|---|---|---|
| JP | 2003-259310 A2 | 9/2003 |
| JP | 2006-270690 A | 10/2006 |
| WO | WO 2005/081528 A1 | 9/2005 |

OTHER PUBLICATIONS

"NewFront Browser v3.4," Access Co., Ltd., Nov. 30, 2006 [online] [Retrieved on Jul. 11, 2008] Retrieved from the Internet<URL:http://www.access.company.com/PDF/NetFront/120406_NFv34.pdf>.

(Continued)

*Primary Examiner* — Bernard Krasnic
(74) *Attorney, Agent, or Firm* — Fenwick & West LLP

(57) ABSTRACT

A system and a method for communicating video data associated with content across a network are disclosed. A server partitions the content into a plurality of tiles where each tile includes a subset of the content and index data describing a relationship between a tile and one or more adjacent tiles. Each tile is then encoded as a video frame, for example each tile is encoded according to the H.264 standard. The plurality of tiles are then transmitted to a client which combines the plurality of tiles using the index data to locally recreate the content. The client associates a predetermined viewport tile with a client viewport representing the area of the content that is visible in a client display device to allow viewing of the content while tiles not associated with the client viewport are cached to expedite subsequent retrieval.

15 Claims, 12 Drawing Sheets

(56) References Cited

U.S. PATENT DOCUMENTS

| | | |
|---|---|---|
| 6,285,791 B1* | 9/2001 | Bjorklund ............... 382/236 |
| 6,292,834 B1 | 9/2001 | Ravi et al. |
| 6,366,298 B1 | 4/2002 | Haitsuka et al. |
| 6,397,230 B1 | 5/2002 | Carmel et al. |
| 6,496,203 B1 | 12/2002 | Beaumont et al. |
| 6,529,552 B1 | 3/2003 | Tsai et al. |
| 6,563,517 B1 | 5/2003 | Bhagwat et al. |
| 6,578,201 B1 | 6/2003 | LaRocca et al. |
| 6,584,493 B1 | 6/2003 | Butler |
| 6,601,104 B1 | 7/2003 | Fallon |
| 6,604,158 B1 | 8/2003 | Fallon |
| 6,704,024 B2 | 3/2004 | Robotham et al. |
| 6,909,753 B2 | 6/2005 | Meehan et al. |
| 6,990,534 B2 | 1/2006 | Mikhailov et al. |
| 7,016,963 B1 | 3/2006 | Judd et al. |
| 7,043,745 B2 | 5/2006 | Nygren et al. |
| 7,054,365 B2 | 5/2006 | Kim et al. |
| 7,088,398 B1 | 8/2006 | Wolf et al. |
| 7,116,843 B1* | 10/2006 | Wensley et al. ............... 382/305 |
| 7,161,506 B2 | 1/2007 | Fallon |
| 7,257,158 B1 | 8/2007 | Figueredo et al. |
| 7,321,937 B2 | 1/2008 | Fallon |
| 7,352,300 B2 | 4/2008 | Fallon |
| 7,378,992 B2 | 5/2008 | Fallon |
| 7,483,575 B2 | 1/2009 | Fukuhara et al. |
| 7,821,953 B2 | 10/2010 | Yarlagadda et al. |
| 8,018,850 B2 | 9/2011 | Van Beek et al. |
| 2002/0015532 A1 | 2/2002 | Kostrzewski et al. |
| 2002/0041629 A1 | 4/2002 | Hannuksela |
| 2002/0059368 A1 | 5/2002 | Reynolds |
| 2002/0067353 A1* | 6/2002 | Kenyon et al. ............... 345/419 |
| 2002/0122491 A1 | 9/2002 | Karczewicz et al. |
| 2002/0131083 A1 | 9/2002 | Hamzy et al. |
| 2002/0146074 A1 | 10/2002 | Ariel et al. |
| 2003/0020722 A1 | 1/2003 | Miura et al. |
| 2003/0039312 A1 | 2/2003 | Horowitz et al. |
| 2003/0046708 A1 | 3/2003 | Jutzi |
| 2003/0079222 A1 | 4/2003 | Boykin et al. |
| 2003/0122954 A1 | 7/2003 | Kassatly |
| 2003/0132957 A1 | 7/2003 | Ullmann et al. |
| 2003/0138050 A1 | 7/2003 | Yamada et al. |
| 2003/0177269 A1 | 9/2003 | Robinson et al. |
| 2003/0198184 A1 | 10/2003 | Huang et al. |
| 2003/0227977 A1 | 12/2003 | Henocq |
| 2004/0022312 A1 | 2/2004 | Dye |
| 2004/0067041 A1 | 4/2004 | Seo et al. |
| 2004/0083236 A1 | 4/2004 | Rust |
| 2004/0109005 A1 | 6/2004 | Witt et al. |
| 2004/0184523 A1 | 9/2004 | Dawson et al. |
| 2004/0217980 A1* | 11/2004 | Radburn et al. ............... 345/672 |
| 2005/0052294 A1 | 3/2005 | Liang et al. |
| 2005/0081158 A1 | 4/2005 | Hwang |
| 2005/0089092 A1 | 4/2005 | Hashimoto et al. |
| 2005/0100233 A1 | 5/2005 | Kajiki et al. |
| 2005/0105619 A1 | 5/2005 | Lee et al. |
| 2005/0132286 A1 | 6/2005 | Rohrabaugh et al. |
| 2005/0147247 A1 | 7/2005 | Westberg et al. |
| 2005/0195899 A1 | 9/2005 | Han |
| 2005/0232359 A1 | 10/2005 | Cha |
| 2005/0257167 A1 | 11/2005 | Fraleigh et al. |
| 2005/0267779 A1 | 12/2005 | Lee et al. |
| 2006/0018378 A1 | 1/2006 | Piccinelli et al. |
| 2006/0069797 A1 | 3/2006 | Abdo et al. |
| 2006/0078051 A1 | 4/2006 | Liang et al. |
| 2006/0095944 A1 | 5/2006 | Demircin et al. |
| 2006/0098738 A1 | 5/2006 | Cosman et al. |
| 2006/0150224 A1 | 7/2006 | Kamariotis |
| 2006/0168101 A1 | 7/2006 | Mikhailov et al. |
| 2006/0174026 A1 | 8/2006 | Robinson et al. |
| 2006/0174614 A1 | 8/2006 | Dong et al. |
| 2006/0184614 A1 | 8/2006 | Baratto et al. |
| 2006/0210196 A1* | 9/2006 | Wensley et al. ............... 382/305 |
| 2006/0218285 A1 | 9/2006 | Talwar et al. |
| 2006/0233246 A1 | 10/2006 | Park et al. |
| 2006/0277478 A1 | 12/2006 | Seraji et al. |
| 2006/0282855 A1 | 12/2006 | Margulis |
| 2006/0285594 A1* | 12/2006 | Kim et al. ............... 375/240.16 |
| 2006/0291561 A1 | 12/2006 | Seong et al. |
| 2007/0098283 A1 | 5/2007 | Kim et al. |
| 2007/0116117 A1 | 5/2007 | Tong et al. |
| 2007/0121720 A1 | 5/2007 | Yamane et al. |
| 2007/0250711 A1 | 10/2007 | Storey |
| 2007/0277109 A1 | 11/2007 | Chen et al. |
| 2008/0062322 A1 | 3/2008 | Dey et al. |
| 2008/0065980 A1 | 3/2008 | Hedbor |
| 2008/0071857 A1 | 3/2008 | Lie |
| 2008/0158333 A1 | 7/2008 | Krisbergh et al. |
| 2009/0219992 A1 | 9/2009 | Wang |
| 2009/0245668 A1 | 10/2009 | Fukuhara et al. |

OTHER PUBLICATIONS

PCT International Search Report and Written Opinion, PCT/US08/52129, Jul. 23, 2008, 7 pages.

PCT International Search Report and Written Opinion, PCT/US08/52092, Jul. 14, 2008, 9 pages.

PCT International Search Report and Written Opinion, PCT/US07/83218, Jun. 12, 2008, 7 pages.

PCT International Search Report and Written Opinion, PCT/US07/83203, Apr. 3, 2008, 9 pages.

Hsieh, M-D. et al., "Stateful Session Handoff for Mobile WWW," Revised Form Jan. 27, 2005, Accepted Feb. 26, 2005, Information Sciences, Elsevier, pp. 1241-1265, vol. 176.

Hsieh, M. et al., "Stateful Session Handoff for Mobile WWW," Information Sciences 2005, [online] [Retrieved Apr. 10, 2008] Retrieved from the Internet<URL:http:140.115.51.197/web/PaperManage/Paper/Stateful%20session%20handoff%20for%20mobile%20WWW.pdf>.

International Search Report and Written Opinion, PCT/US07/83214, Apr. 30, 2008, 7 pages.

Warabino, T. et al., "Video Transcoding Proxy for 3Gwireless Mobile Internet Access," IEEE Communications Magazine, Oct. 2000, pp. 66-71.

Japanese Office Action, Japanese Application No. 2009-534948, Feb. 18, 2013, 4 pages.

* cited by examiner

DYNAMIC CLIENT-SERVER VIDEO TILING STREAMING

CROSS-REFERENCE TO RELATED APPLICATION

The present application claims priority under 35 U.S.C. §119(e) to U.S. Provisional Patent Application No. 60/886,577 filed on Jan. 25, 2007, which is incorporated by reference herein in its entirety.

BACKGROUND

1. Field of Art

The present invention generally relates to the field of delivery of video content to a mobile device, and more specifically, to tiling video content for transmission to a mobile device having a limited display area.

2. Description of the Related Art

The present invention relates to an architecture for the delivery of video content responsive to remote interaction. In particular, the present invention is related to communicating a succession of video frames associated with a web page or other data to a device in an interactive manner.

Client-server architectures are used in various contexts in many different types of network environments. In some network environments, bandwidth limitations are one of the main concerns preventing implementation of a client-server architecture. Such bandwidth-constrained environments may occur in both wired and wireless networks, including combinations/hybrids of such networks. Taking the example of a wireless network, client devices may additionally be resource-constrained with respect to device capabilities, including, for instance, processing power, memory or other storage resources and power (i.e., battery) limitations. End-user applications that consume relatively large amounts of bandwidth and processing power, such as web browser applications, may provide unsatisfactory user experiences when run on a mobile client device. These unsatisfactory user experiences often result from a poor ability to provide the fast-paced interactivity expected of web browsing sessions. Many mobile client devices, such as cellular phones, may not be capable of adequately supporting full-featured versions of such applications.

Compounding this, websites are continually becoming more feature-rich, and increasingly make use of various ancillary software (such as animation plugins), which are not supported on many mobile client devices. Video transmission of content to many mobile client devices also often provides an unsatisfactory user experience due to bandwidth limitations and the inability of existing client-server architectures to adequately adjust to this limitation. Further, display resources of a mobile client device are constrained by the mobile client device size, making it difficult to view or access video content which is too large to be completely displayed by the display resources of the mobile client device.

There exists a need to support a full-featured web browsing experience on a diverse cross-section of bandwidth and capability-limited mobile devices, as well as to support the use of other applications on these same devices. Embodiments of this invention will address other needs as well.

SUMMARY

A system and a method are disclosed for communicating video data associated with content across a network are disclosed. A server partitions the content into a plurality of tiles where each tiles includes a subset of the content and index data describing a relationship between a tile and one or more adjacent tiles. Each tile is then encoded as a video frame, for example each tile is encoded according to the H.264 standard. The plurality of tiles are then transmitted to a client which combines the plurality of tiles using the index data to locally recreate the content. The client associates a predetermined viewport tile with a client viewport representing the area of the content that is visible in a client display device to allow viewing of the content while tiles not associated with the client viewport are cached to expedite subsequent retrieval.

In another embodiment, a plurality of tiles each comprising a video frame including a subset of content and index data describing a relationship between a tile and one or more adjacent tiles. The index data is used to combine the tiles into a grid which includes the content. One or more of the received tiles are associated with a viewport position, the viewport position representing the content visible in a display area of a client device. As the one or more received tiles associated with the viewport position are predetermined, the video frames associated with those tiles are uncompressed so the content included in the one or more tiles associated with the viewport position is displayed.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the following detailed description and the appended claims, when taken in conjunction with the accompanying drawings, in which:

DETAILED DESCRIPTION

Figure 1:
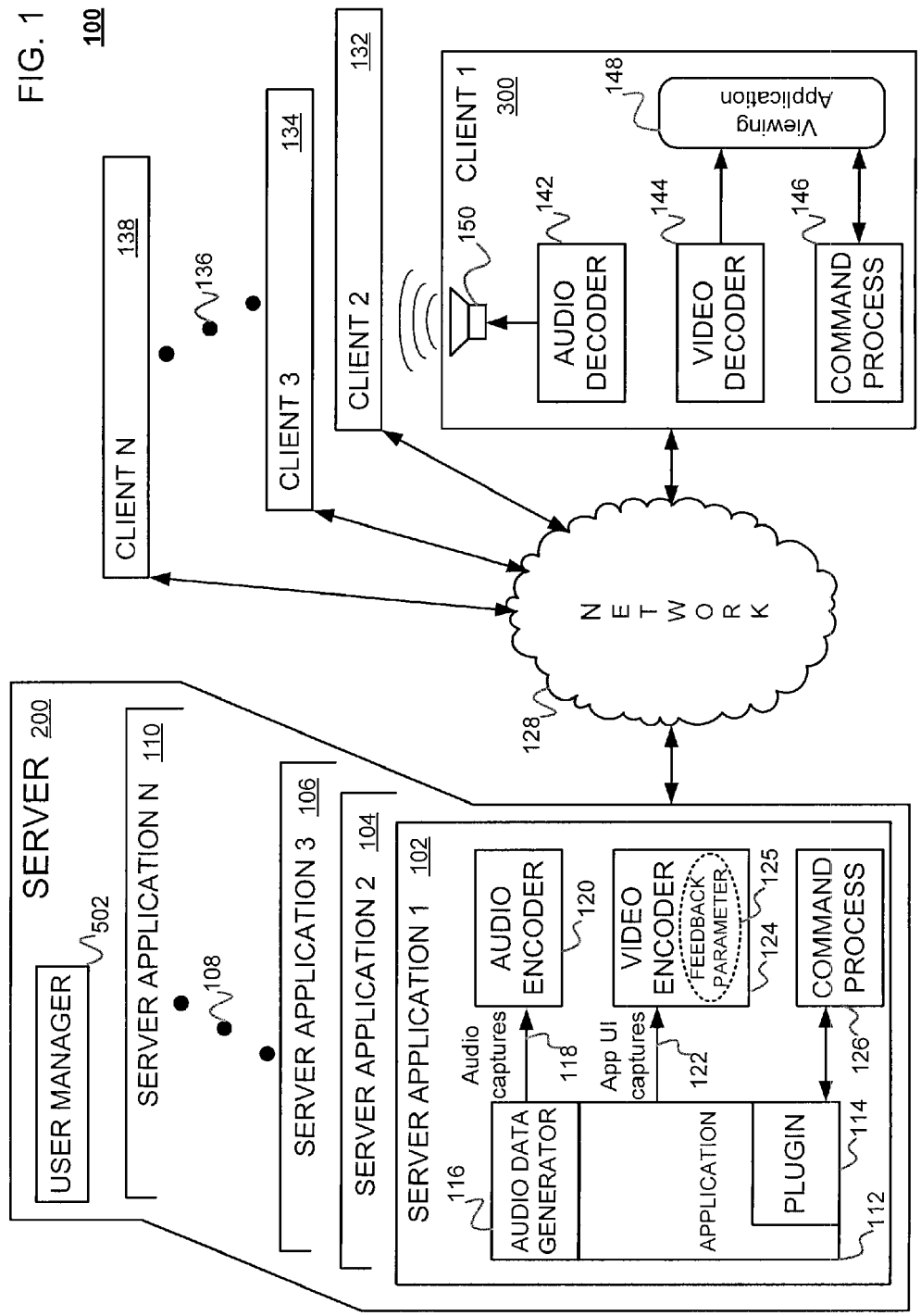
FIG. 1 is a block diagram illustrating some aspects of a client-server architecture of the present invention, according to one embodiment.

The present invention is now described more fully with reference to the accompanying Figures, in which one or some embodiments of the invention are shown. The present invention may be embodied in many different forms and should not be construed as limited to the embodiments set forth herein. Rather these embodiments are provided so that this disclosure will be complete and will fully convey principles of the invention to those skilled in the art.

For illustrative purposes, embodiments of the invention are described in connection with a server or a mobile client device, such as an example mobile client device. Various specific details are set forth herein regarding embodiments with respect to servers and mobile client devices to aid in understanding the present invention. However, such specific details are intended to be illustrative, and are not intended to restrict in any way the scope of the present invention as claimed herein. In particular, one skilled in the art will recognize that the invention can be used in connection with a wide variety of contexts, including, for example, client devices operating in a wired network. In addition, embodiments of the invention are described in connection with a web browsing application, but such descriptions are intended to be illustrative and examples, and in no way limit the scope of the invention as claimed. Various embodiments of the invention may be used in connection with many different types of programs, including an operating system (OS), a wide variety of applications, including word processing, spreadsheet, presentation, and database applications, and so forth.

In some embodiments, the present invention is implemented at least partially in a conventional server computer system running an OS, such as a Microsoft OS, available from Microsoft Corporation; various versions of Linux; various versions of UNIX; a MacOS, available from Apple Computer Inc.; and/or other operating systems. In some embodiments, the present invention is implemented in a conventional personal computer system running an OS such as Microsoft Windows Vista or XP (or another Windows version), MacOS X (or another MacOS version), various versions of Linux, various versions of UNIX, or any other OS designed to generally manage operations on a computing device.

In addition, the present invention can be implemented on, or in connection with, devices other than personal computers, such as, for example, personal digital assistants (PDAs), cell phones, computing devices in which one or more computing resources is located remotely and accessed via a network, running on a variety of operating systems. The invention may be included as add-on software, or it may be a feature of an application that is bundled with a computer system or sold separately, or it may even be implemented as functionality embedded in hardware.

Output generated by the invention can be displayed on a screen, transmitted to a remote device, stored in a database or other storage mechanism, printed, or used in any other way. In addition, in some embodiments, the invention makes use of input provided to the computer system via input devices such as a keyboard (screen-based or physical, in a variety of forms), scroll wheels, number pads, stylus-based inputs, a touchscreen or touchpad, etc. Such components, including their operation and interactions with one another and with a central processing unit of the personal computer, are well known in the art of computer systems and therefore are not depicted here.

Any software portions described herein with reference to modules need not include discrete software modules. Any software configuration described herein is meant only by way of example; other configurations are contemplated by and within the scope of various embodiments of the present invention. The term, engine, is used herein to denote any software or hardware configuration, or combination thereof, that performs the function or functions referenced.

Reference in the specification to "one embodiment" or "an embodiment" means that a particular feature, structure, or characteristic described in connection with the embodiment is included in at least one embodiment of the invention. The appearance of the phrase "in one embodiment" in various places in the specification does not necessarily refer to the same embodiment. The appearance of the phrase "in some embodiments" in various places in the specification are not necessarily all referring to the same set of embodiments. The appearance of the phrase "in various embodiments" in various places in the specification are not necessarily all referring to the same set of embodiments.

1. System

FIG. 1 is a block diagram illustrating some aspects of system 100 of the present invention, according to one embodiment. System 100 employs a client-server architecture that includes a number of server application instances running on server 200, including server application 1 (102), server application 2 (104), server application 3 (106), and a wide-ranging number of additional server applications (represented by ellipsis 108), up to server application n (1 10). The term "server application" is used herein to denote a server-side application, i.e., an application running on one or more servers. Server application n (110) represents the number of server application instances that happen to be running in system 100 at any given point. Server 200 also includes user manager module 502, which serves to manage multiple users among the multiple server application instances 102-110. User manager module 502 is described herein in FIG. 5, and represents one of potential multiple user managers running on server 200. Server 200 is running one instance of an OS underlying server applications 102-110. In another embodiment, server 200 may run multiple instances of an OS, each OS instance including one or more application instances.

While FIG. 1 illustrates multiple server applications 102-110, in other embodiments, a number of different types of programs may be alternately used, including, for instance, an OS. Server applications 102-110 illustrated in FIG. 1 may run on one server 200 or any number of servers, as, for example, in one or more server farm environments. Server applications 102-110 may each comprise instances of different server applications, or may all comprise an instance of one server application. For example, each server application 102-110 could comprise a separate instance of a web browsing application.

A. Server

Describing server application 1 (102) in further detail, as an example server application instance, server application 1 (102) includes application 112, plugin 114, audio data generator 116, audio encoder module 120, video encoder module 124, and command process module 126. Video encoder module 124 makes use of feedback parameter 125.

Video encoder module 124 is operatively coupled to application 112, and is adapted to receive a succession of captures (122) of the user interface (UI) of application 112 for encoding into video frames for transmission via network 128. The succession of captures (122) of the UI comprise data that is captured and transferred from application 112 to video encoder 124 by a separate module, described and illustrated in FIG. 2 (image management module 216). The term, user interface, as used throughout this disclosure, refers to all or a portion of any user interface associated with a wide variety of computer programs.

The encoding of application UI captures (122) is not limited to any particular encoding or video compression format, and may include a wide variety of video compression techniques, ranging from the use of a video compression standard, such as H.264, to an entirely customized form of video compression, to a modified version of a video compression standard, and so forth.

Audio encoder module 120 is operatively coupled to audio data generator 116 of application 112, and is adapted to transform audio captures 118 (e.g., an audio stream) of audio data generator 116 into an encoded audio stream for transmission via network 128. Audio captures 118 comprises data being transferred from audio data generator 116 to audio encoder module 120.

Audio data generator 116 is operatively coupled to application 112, and is adapted to generate the audio data accompanying application 112. Plugin 114 is operatively coupled to application 112 and command process module 126. Plugin 114 is adapted to facilitate the interface between application 112 and command process module 126.

Figure 2:
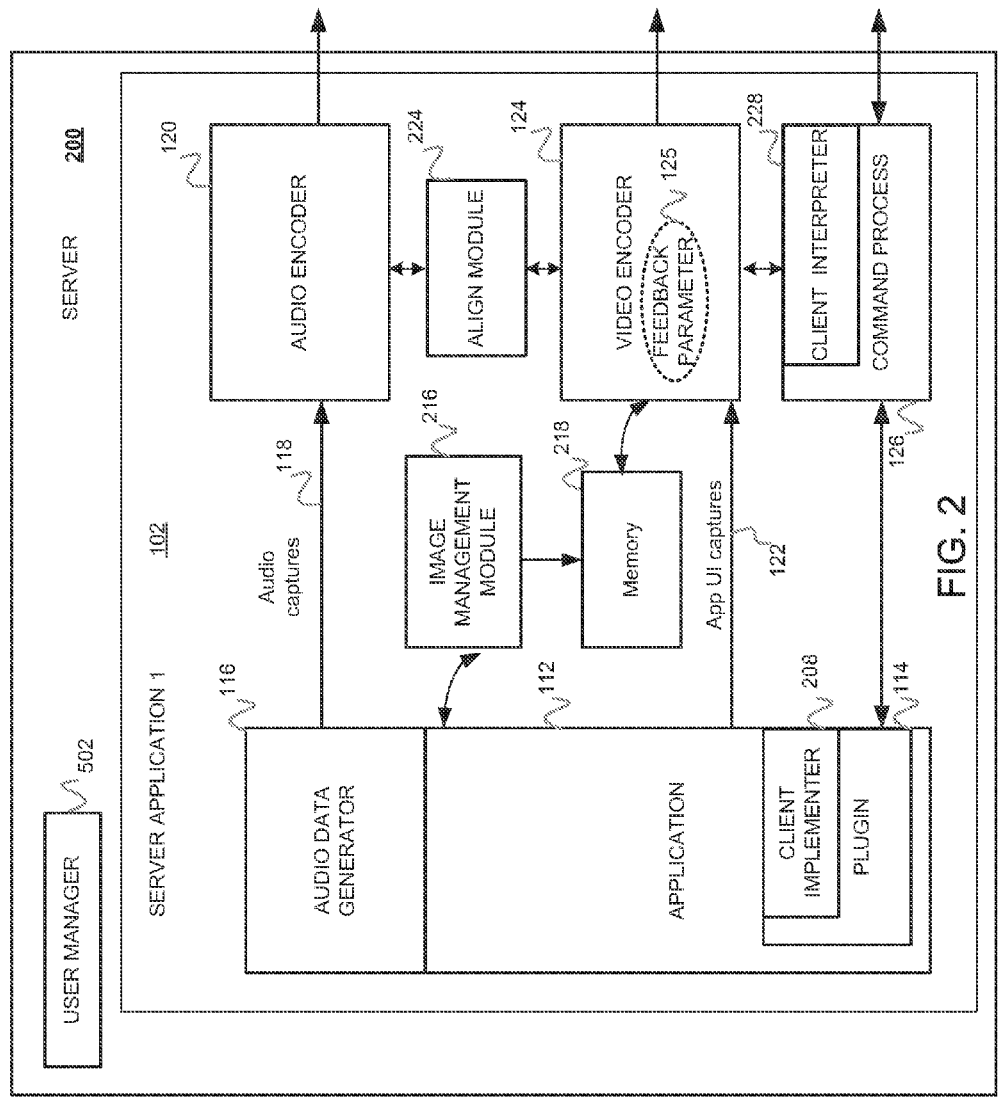
FIG. 2 is a block diagram illustrating some aspects of the present invention in connection with a server, according to one embodiment.

Server 200 is further described herein in FIG. 2.

C. Client

System 100 includes a number of clients, including client 1 (300), client 2 (132), client 3 (134), and a wide-ranging number of additional clients (represented by ellipsis 136), up to client n (138), with client n (138) representing the number of clients that happen to be engaged in the system at any given point. As illustrated in FIG. 1, the different clients comprise different, non-related client devices.

Describing client 1 (300) in further detail, as an example client, client 1 (300) may include audio decoder module 142, video decoder module 144, command process module 146, viewing application 148, and speaker 150. Video decoder module 144 may be adapted to decode the succession of video frames encoded by video encoder module 124, where the successive video frames have been transmitted across network 128 for reception by client 1 (300). Video decoder module 144 may be operatively coupled to viewing application 148, and adapted to communicate the decoded video frames to viewing application 148 for display of the video frames on client 1 (300).

Client 1 (300) includes speaker 150, and audio decoder module 142 is operatively coupled to speaker 150. Audio decoder module 142 is adapted to decode the audio captures encoded by audio encoder module 120, where the encoded audio has been transmitted across network 128 for reception by client 1 (300). After decoding the audio stream, audio decoder module 142 may communicate the decoded audio to speaker 150 for audio output from client 1 (300).

Viewing application 148 is adapted to receive user input and communicate the user input to command process module 146. Command process module 146 is adapted to communicate the user input back to command process module 126 of application 102 via network 128. Command process module 126 is adapted to communicate the user input to application 112 via plugin 114.

Plugin 114 facilitates the remote interactive use of application 112 via the system 100 described in FIG. 1. Plugin 114 may also be an extension. In another embodiment, application 112 may be customized for use with the client-server architecture of this invention to the extent that a special plugin is not needed. In yet another embodiment, neither a plugin nor any special application modifications may be needed.

Command process module 146 is adapted to communicate one or more feedback parameters (125) to command process module 126. Command process module 126 is adapted to communicate the one or more feedback parameters 125 to video encoder module 124 and audio encoder module 120 for their respective encoding of the succession of application UI captures 122 and audio captures 118. The one or more feedback parameters 125 may comprise one or more of a wide range of parameters, including a bandwidth parameter relating to at least a portion of network 128, a device parameter of client 1 (300) or a user input for client 1 (300).

The one or more feedback parameters (125) may comprise a bandwidth parameter, which may include any estimated or measured bandwidth data point. An example bandwidth parameter may include estimated bandwidth based on measurements of certain packets traversing between server 200 and client 1 (300), (e.g., how much data sent divided by traversal time to obtain a throughput value), or other bandwidth information obtained from, or in conjunction with, network 128, including from a network protocol. The one or more feedback parameters (125) may comprise user input for client 1 (300), including, for example, a user request for encoding performed in a certain format or manner, with such a request being requested and communicated by viewing application 148. The one or more feedback parameters (125) may comprise a display resolution of client 1 (300) (e.g., CGA, QVGA, VGA, NTSC, PAL, WVGA, SVGA, XGA, etc.). The one or more feedback parameters 125 may comprise other screen parameters (e.g., screen size, refresh capabilities, backlighting capabilities, screen technology, etc.) or other parameters of the client device (e.g., device processor, available memory for use in storing video frames, location if GPS or other location technology-enabled, etc.). None of the example feedback parameters discussed above are meant to exclude their combined use with each other, or other feedback parameters. In some embodiments, video encoder module 124 may be adapted to at least partially base its video sample rate on the one of more feedback parameters (125).

The multiple clients depicted in FIG. 1 are illustrated to indicate that each client may potentially comprise a different type of client device, each with its own one or more feedback parameters.

Figure 3:
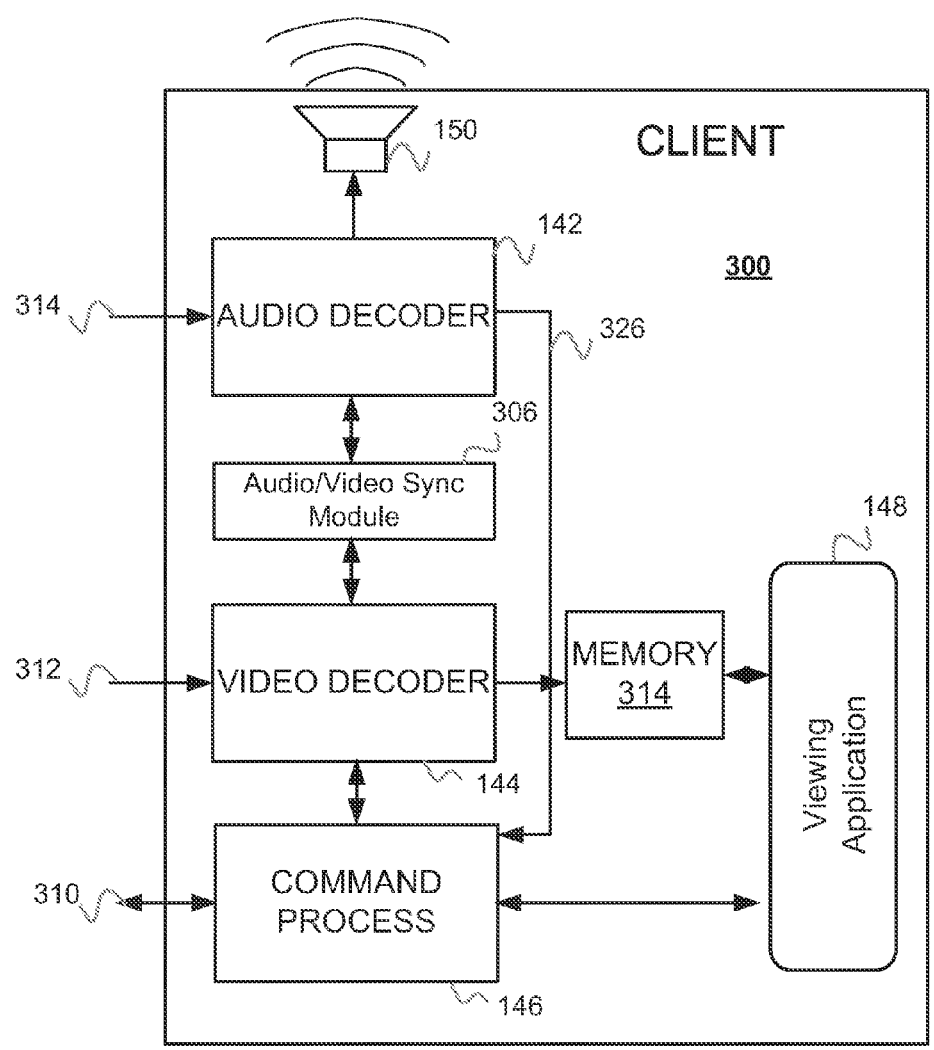
FIG. 3 is a block diagram illustrating some aspects of the present invention in connection with a client, according to one embodiment.

Client 1 (300) is further described herein in conjunction with FIG. 3.

One skilled in the art will recognize that the client-server architecture illustrated in FIG. 1 is merely an example, and that the invention may be practiced and implemented using many other architectures and environments.

FIG. 2 is a block diagram illustrating some aspects of the present invention in connection with server 200, according to one embodiment. Server 200 includes user manager module 502, server application 1 (102), application 112, plugin 114, audio data generator 116, audio encoder module 120, image management module 216, memory 218, video encoder module 124 (which includes feedback parameter 125), command process module 126, and align module 224. Command process module 126 includes client interpreter sub-module 228, and plugin 114 includes client implementer sub-module 208. The components illustrated in FIG. 2 with the same numbers as components illustrated in FIG. 1 correspond to those respective components of FIG. 1, and thus their general operation will not be repeated. While one running application is illustrated with respect to server 200, server application 102 is illustrated as a representative instance of multiple server applications running on server 200, each of the multiple server applications being associated with its own distinct client (clients are not shown in this illustration).

Image management module 216 serves to capture the UI of application 112 (as the UI would appear on a screen) and save the capture in memory 218. Any capture process such as screen-scraping may be used, and image management module 216 may perform this capture at any desired rate. Image management module 216 also compares the last prior capture of the application UI to the current capture to determine whether any changes have occurred in a particular area of the application UI. Any image/video frame matching process may be used for this comparison operation. Image management module 216 serves to repetitively perform this function.

If image management module 216 detects any change in the particular area of interest, a delta flag is set to indicate that the area of interest has changed. Upon detecting a change, image management module 216 serves to convert the native format of the UI rendered data to a video frame format more suited for compression and transmission to the client device (e.g., color space transformation, data format transformation, etc.). Image management module 216 serves to resize the image for the reformatted video frame. In the embodiment of FIG. 2, multiple parameters of the applicable client device were included in the one or more feedback parameters 125, allowing image management module 216 to perform the reformatting and resizing based on client device parameters (the relevant parameters having been communicated to image management module 216).

Image management module 216 periodically checks (based on its sample interval) if the delta flag has been set. If the delta flag is detected as set during a check, the reformatted/resized video frame in memory 218 is encoded by video encoder module 124 for transmission to the client device.

Client interpreter sub-module 228 of command process module 126 serves to interpret data received from client device 300 and to translate this data for use in connection with video encoder module 124, audio encoder module 120 and application 112 (e.g., user commands, etc.). Client interpreter sub-module 228 serves to pass the feedback parameters 125 to video encoder module 124 and audio encoder 120 for use in encoding.

Client interpreter sub-module 228 of command process module 126 serves to translate client-received data for use in connection with plugin 114 and its client implementer sub-module 208. In communicating back user input, the client device passes coordinates (of a cursor, etc.) relative to the client device's screen to command process 126. Client interpreter sub-module 228 serves to determine the corresponding location in relation to the viewport of the client device and the application UI. Client interpreter sub-module 228 then communicates the translated coordinates to plugin 114 for use by its client implementer sub-module 208. Client implementer sub-module 208 serves to translate from conventional user input to a format appropriate for application 112, and then to directly inject the translated input into application 112.

Align module 224 correlates and cross-stamps video frames encoded by video encoder module 124 and audio encoded by audio encoder module 120, so that the audio stream and the video frames associated with the UI of application 112 may be readily matched at client device 300. Image management module 216 may also serve to time-stamp all images, and the operation of capturing audio from audio data generator 116 may also serve to timestamp the audio stream, both for downstream alignment by align module 224, as would be appreciated by one skilled in the art. In another embodiment, all alignment/matching of audio and video frames may be performed at the client device.

One skilled in the art will recognize that the illustration of FIG. 2 is merely an example, and that the invention may be practiced and implemented in many other ways.

FIG. 3 is a block diagram illustrating some aspects of the present invention in connection with a client, according to one embodiment. Client 300 includes video decoder module 144, audio decoder module 142, audio/video sync module 306, command process module 146, speaker 150, viewing application 148, and connections 310, 312 and 314.

Video decoder module 144 receives encoded video frames via connection 312, while audio decoder module 142 receives an encoded audio stream via connection 314. Audio/video sync module 306 serves to match time-stamps or another type of identifier on the audio stream and the video frames for synced output via speaker 150 and viewing application 148, respectively. Audio decoder module 142, video decoder module 144 and viewing application 148 all may serve to provide feedback to command process module 146, to communicate back to the server-side application feedback parameters (not illustrated in FIG. 3), including to vary the sample rate and/or compression of the video encoding, the audio encoding, etc. Video decoder module 144 also receives video data from memory 314. In an embodiment, memory 314 comprises a cache or other volatile storage device and can comprise a combination of volatile and non-volatile storage devices. For example, the memory 314 stores one or more video frames that are input to the video decoder module 144 for display.

Command process module 146 serves to pass feedback parameters of client 300 for use in video and/or audio encoding upon initiation of a session or during a session. Such feedback parameters may include one or more of the following parameters: display resolution, screen size, processor identification or capabilities, memory capabilities/parameters, speaker capabilities, and so forth.

Viewing application 148 displays the succession of video frames of a portion of the server-side application's UI. Viewing application 148 serves to facilitate communicating user input control, including user commands, to command process module 146 for transmission back to the server. Client user input control passed back to the server may include, for example, input from: a keyboard (screen-based or physical, in a variety of forms), scroll wheels, number pads, stylus-based inputs, a touchscreen or touchpad, etc. Viewing application 148 serves to aggregate certain user input for sending, such as opening up a local text box for text entry.

One skilled in the art will recognize that the illustration of FIG. 3 is merely an example, and that the invention may be practiced and implemented in many other ways.

Figure 4:
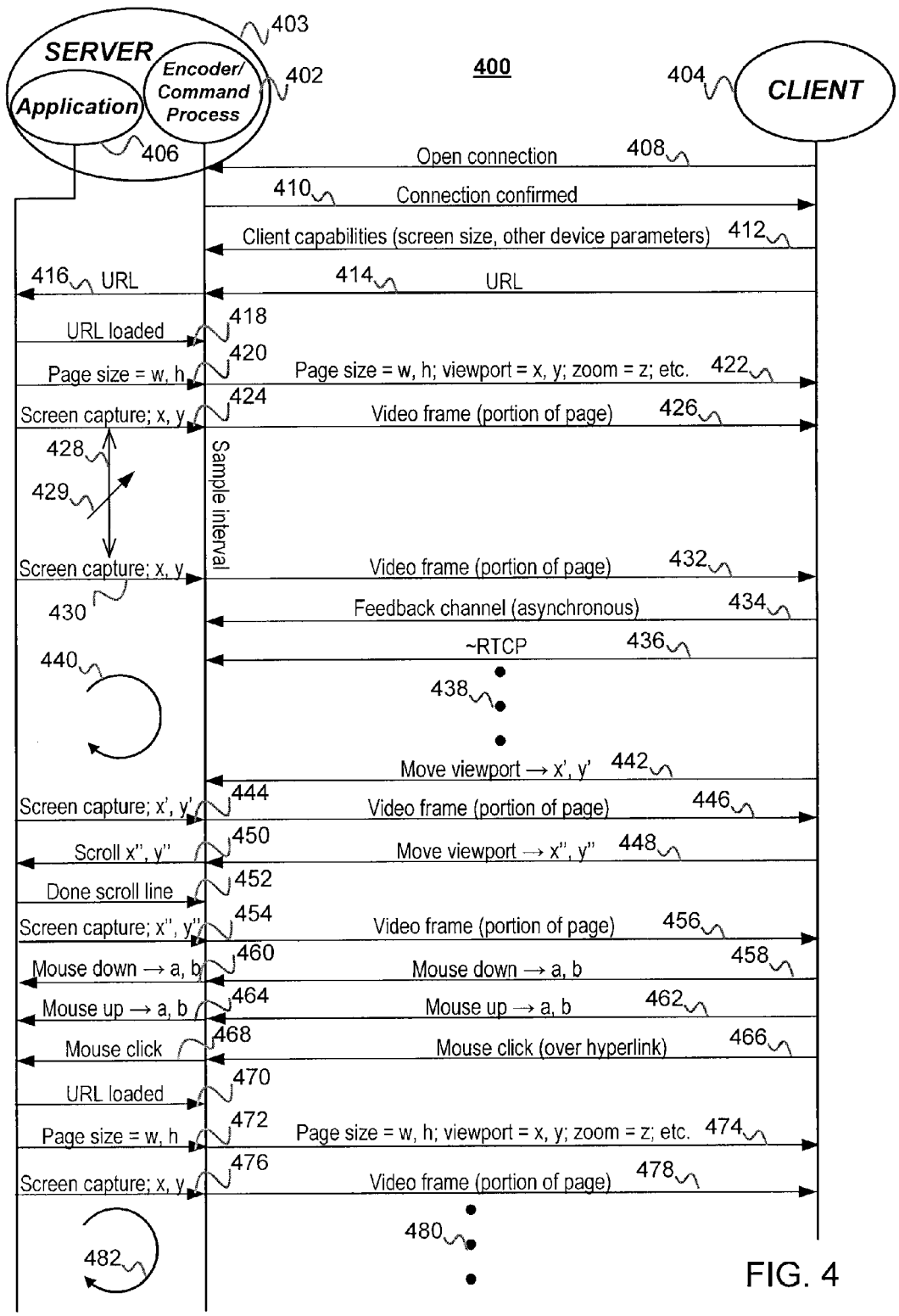
FIG. 4 is an event diagram illustrating some aspects of a client-server exchange of video data, including an accompanying exchange within the server, according to one embodiment.

FIG. 4 is a diagram illustrating some aspects of client-server exchange 400, according to one embodiment. Client-server exchange 400 depicts a session exchange between server 403 and client 404, with an accompanying exchange between encoder/command process modules 402 and application 406 (both running on server 403) also being illustrated. Application 406 comprises a web browsing application in this embodiment. Encoder/command process modules 402 comprise audio and video encoder modules and a command process module. References to exchanges with encoder/command process modules 402 may only specifically comprise an exchange with one of these modules, as would be appreciated by one skilled in the art. In another embodiment, a functional element similarly situated as encoder/command process modules 402 may comprise a video encoder module and a command process module, but not an audio encoder module. As described herein, server 403 may refer to any server-side machine, and may include a number of servers, either located in one facility or geographically dispersed, operating in conjunction to facilitate the operations described in FIG. 4. These servers may include authentication servers, database servers, etc.

Client 404 initiates client-server exchange 400 with operation 408, open connection. Server 403 responds with operation 410, connection confirmed. Client 404 then send its capabilities to encoder/command process modules 402, including screen size and other device parameters, via operation 412. The device parameters may include a wide variety of device parameters, including a device processor, memory, screen characteristics, etc. Client 404 then sends a URL via operation 414, which may comprise a saved URL (e.g., a homepage) or a URL entered by the user of client 404. Encoder/command process modules 402 in turn communicate the URL to application 406 via operation 416, and application 406 then loads the URL via operation 418. Application 406 also passes the width (w) and height (h) of the web page associated with the URL to encoder/command process modules 402 via operation 420. Encoder/command process modules 402 then communicates the web page size to client 404, as well as the viewport visible on the client screen, including parameters characterizing the viewport of the client, e.g., a corner coordinate (x, y) and an associated zoom factor (z), via operation 422.

A screen capture of the webpage viewport (the portion of the browser UI that the viewport has been associated with) then takes place via operation 424, in accordance with a number of techniques known in the art. A video frame of the web page visible through the viewport is then communicated to client 404 via operation 426. A subsequent screen capture 430 then takes place after a variable sample interval 428, with the associated video frame being communicated via operation 432. Arrow symbol 429, commonly used to indicate a variable element, is illustrated crossing variable sample interval 428 to indicate this novel feature.

An asynchronous feedback channel provides feedback via operation 434. This feedback may be used to vary the sample interval 428 based on one or more feedback parameters, including client device parameters, user input parameters, and/or estimated bandwidth parameters, such as bandwidth parameters based on measurements of the packets traversing back and forth between server 403 and client 404. RTCP protocol, or a similar such protocol (standardized or customized) may be used in connection with providing such feedback, as illustrated by operation 436. Ellipsis 438 and cycle 440 illustrate the repetitive nature of the interaction between server 403 sending video frames to client 404.

Sample interval 428 may also be at least partially varied based on the rate of change of the underlying webpage being viewed. For example, if little to no change is detected in the underlying webpage being viewed by client 404, then the frame sample interval may be adjusted upward. Likewise, for a very dynamic webpage, or content within a webpage, the frame sample interval may be adjusted downward.

The user of client 404 may move the viewport from which a webpage is being viewed, to view another portion of the webpage, as depicted in operation 442, with x' and y' comprising new parameters of the viewport. The new portion of the webpage that matches the new viewport will then be captured via operation 444, and a video frame of the new viewport will be communicated to client 404 via operation 446.

The user of client 404 may again move the viewport, as depicted in operation 448, with x" and y" comprising new parameters of the viewport. This time, the new viewport extends beyond what would be displayed on the server browser window, and thus the browser itself must scroll to capture the desired portion of the webpage, as depicted in operation 450. Having appropriately scrolled, as depicted via operation 452, a screen capture of the new viewport will then be obtained, as illustrated in operation 454, with the resulting video frame communicated via operation 456.

The user of client 404 may also use a mouse or mouse-equivalent (e.g., finger tap, etc. on a touchscreen, multi-directional button, trackpoint, stylus moving a cursor, etc.), as shown via operation 458, where a mouse down motion is made, with the new coordinates of the mouse being passed as (a, b). Client 404 will pass coordinates relative to the client device's screen back to encoder/command process modules 402 in such an operation, with encoder/command process modules 402 determining the corresponding location in relation to the viewport and underlying webpage. In the embodiment being described in FIG. 4, server 403 is running an underlying Windows OS, permitting the injection of a mouse message with the appropriate location information to the window associated with browser 406 (whether there is an actual screen being used for rendering or not). This is illustrated via operation 460, and the screen cursor would resultantly move in application 406, and be communicated back in a video frame to client 404 as described above. In other embodiments being used in conjunction with other operating systems, similar such functions may be used if available, or some analogous other such techniques, as would be appreciated by one skilled in the art.

Operations 462, 464, 466 and 468 depict similar mouse-driven events, which will work in an analogous manner. Other input driven control events (such as a keypad entry) may work in the same manner as well. The types of operations depicted in 470, 472, 474, 476 and 478 have been described above, and ellipsis 480 and cycle 482 serve to illustrate on-going interactions as long as the session between client 404 and server 403 continues.

One skilled in the art will recognize that the illustration of FIG. 4 is merely an example, and that the invention may be practiced and implemented in many other ways.

Figure 5:
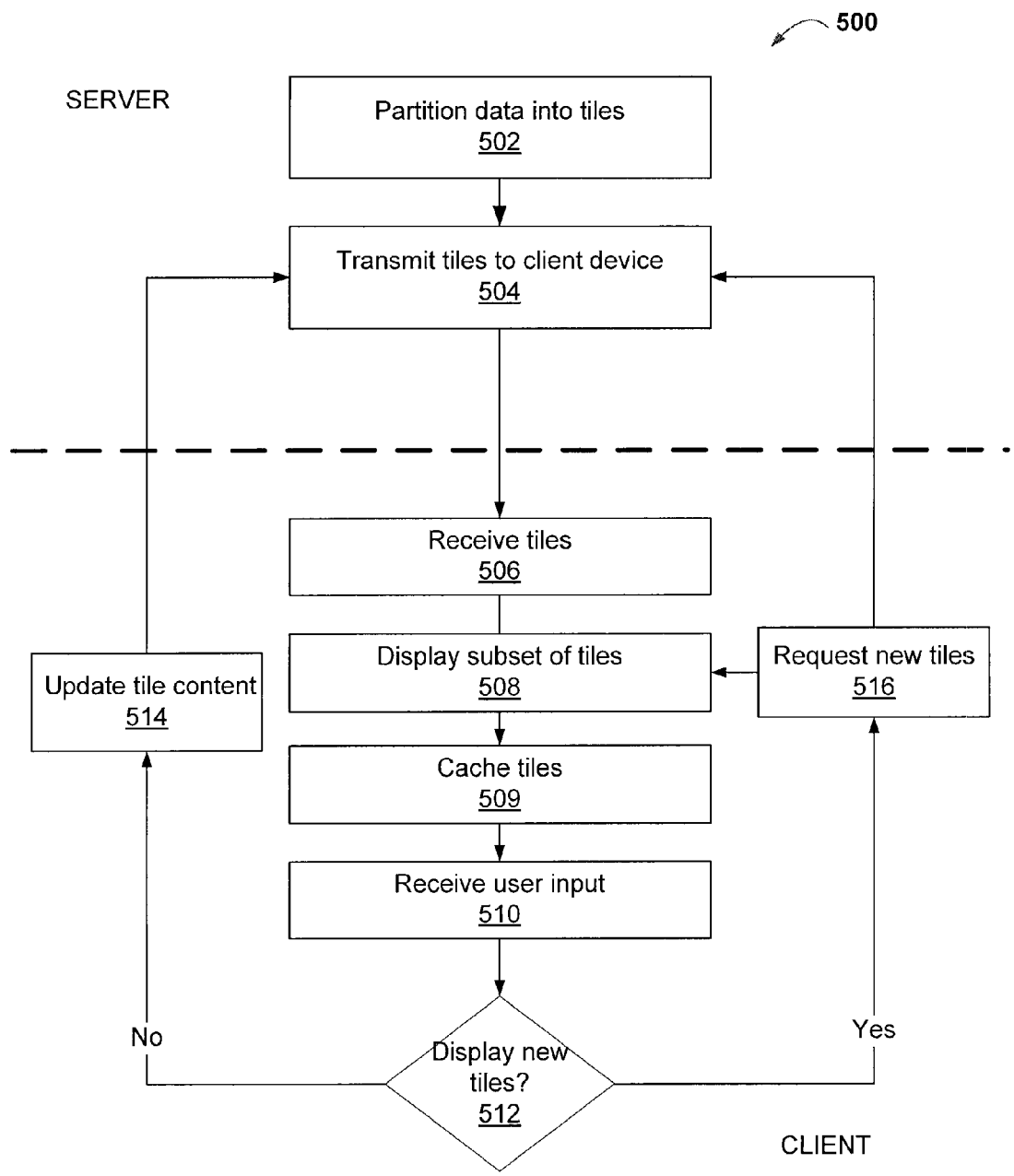
FIG. 5 is a flowchart of a method for transmitting video data from a server to a client, according to one embodiment.

FIG. 5 is a flowchart of a method 500 for transmitting video data from a server to a client, according to one embodiment. For purposes of illustration, FIG. 5 identifies whether an action or step is performed by a server or client according to an embodiment.

As the server communicates a screen capture of the portion of a web page that the client viewport is associated with, the server communicates video frames representing the portion of the web page that the client UI viewport is associated with. However, because the viewport of the client generally is not large enough to allow viewing of a complete web page by the client UI viewport, only a portion of the web page is visible at the client. Transmitting only one or more video frames associated with the portion of the web page associated with the client UI limits the portion of the web page viewable by the client and requires repeated communications between client and server if a user of the client associates the client UI viewport with a different portion of the web page. To conserve network resources, the server transmits one or more video frames of the entire web page, not just the portion of the web page that the client UI viewport is associated with, to the client device. To conserve network resources and storage resources on the client one or more video frames of the web page are compressed as further described below. This combination of compressed video frames and uncompressed video frames allows the client to locally store an entire web page while conserving client storage resources by receiving compressed video frames updating or modifying the portion of the web page that the client UI viewport is associated with, rather than receiving uncompressed video frames updating or modifying the entire web page.

Initially, the server partitions 502 the web page, or other data for transmission to the client, into a plurality of tiles, each tile comprising one or more video frames. In an embodiment, server partitions 502 the web page or other data so that the web page or other data is divided into a grid having a fixed number of tiles. For example, the web page or other data is partitioned 502 into nine tiles which form a 3×3 grid. An example of this tiling is further described below in conjunction with FIG. 9. In an embodiment, the tiles are substantially equal to the size of the client UI viewport rounded up to be divisible by 16. Keeping the tile size divisible by 16 simplifies use of multiple compression techniques, known in the art, to reduce the amount of data transmitted between server and client. For example, each tile is 320 pixels by 320 pixels, which is a size larger than most viewport areas commonly used in conventional mobile devices, such as smart phones.

The plurality of tiles are then transmitted 504 to the client in a compressed format for viewing and/or storage. In an embodiment, each tile includes index data in addition to the one or more video frames so that the client can reconstruct the web page or other data from the plurality of tiles. The index data identifies the tile, the tile size, specifies the location of the tile within the grid and includes clipping data describing how video frames are modified so there is no data outside of the tile. In one embodiment, the index data comprises an ordered pair of coordinates, such as (a, b) to indicate that the tile is associated with row "a" and column "b." In another embodiment, the index data includes a single location value which indicates a grid location associated with the tile. For example, an index is associated with the grid such that a location value of "1" is associated with the upper-leftmost grid location and a location value of "9" is associated with the lower-rightmost position in the grid. In an embodiment, the location value monotonically increases from left to right so that the examination of the location value determines a grid location associated with a tile.

The client then receives 506 the tiles and displays 508 a subset of the tiles in the client UI viewport. This causes the client to initially display 508 one or more tiles so a user can view or interact with the web page or other data. The displayed tiles are also cached 509 by the client device. In one embodiment, the lower-rightmost tiles are displayed 508 in the client UI viewport. To display 508 the tile or tiles, the client video decoder 312 begins decoding the tile or tiles when they are received 506 by the client. For example, the client initially receives 506 a predetermined starting tile which is displayed in the client UI viewport. The client then receives 506 tiles adjacent to the predetermined starting tile in a sequence determined by the server. This causes the client to receive 506 the tiles most likely to be viewed after the predetermined starting tile while the predetermined starting tile is displayed in the client UI viewport. This allows a user of the client to view different portions of the web page or other data before the client receives 506 all the tiles comprising the complete web page or other data.

In addition to displaying 508 and caching 509 the one or more tiles in the client UI viewport, tiles that are not displayed in the client UI viewport are cached 509. Hence, the client caches 509 each of the tiles transmitted 504 from the server. By locally caching 509 these tiles, the client is able to quickly retrieve tiles as the user repositions the client UI viewport. As the tiles are transmitted 504 in a compressed format, tiles that are not displayed in the client UI viewport are cached 509 for decompression and/or display 508 by the client as needed. As the tiles are transmitted 504 in a compressed format, the client is able to maximize the amount of tiles locally stored to reduce the number of data transmissions between server and client. This also conserves client storage resources by caching 509 non-displayed tiles in a compressed format while limiting receipt and use of uncompressed video data to the tile or tiles being displayed 508.

The client then receives 510 a user input to navigate or browse the web page or other data. For example, the received 510 user input comprises a request to move the client UI viewport to a different position in the grid. This requires the client to determine 512 whether one or more non-displayed tiles are associated with the new client UI viewport position. If non-displayed tiles are now associated with the new client UI viewport position, the non-displayed tiles are updated 516 from the server or local cache.

In an embodiment, the non-displayed tiles are retrieved from the local cache on the client. To reduce latency, the client predicatively begins decompressing the non-displayed tiles before they are requested 516. For example, the client initially decompresses one or more tiles adjacent to a displayed tile as it is likely a client user will view the tiles adjacent to the displayed tile or tiles. This predictive decompresses allows the client to quickly retrieve uncompressed video data associated with one or more tiles adjacent to the displayed tile or tiles.

However, the received 510 user input may reposition the client UI viewport to a tile that is not adjacent to the tile originally displayed in the client UI viewport. If this non-adjacent tile has not been received 506 and cached 509 by the client, the non-adjacent tile is requested 516 from the server and transmitted 504 to the client in a compressed format. The client then decompresses the requested 516 tile upon receipt 506 to display 508 the requested tile.

If the received user input is determined 512 to not require displaying tiles not originally displayed in the client UI viewport, the client updates 514 the displayed tile or tiles. For example, the received input comprises a request to refresh the content of the tile displayed in the client UI viewport. An example method for updating 514 content associated a tile displayed in the client UI viewport is further described below in conjunction with FIG. 6.

One skilled in the art will recognize that the illustration of FIG. 5 is merely an example, and that the invention may be practiced and implemented in many other ways.

Figure 6:
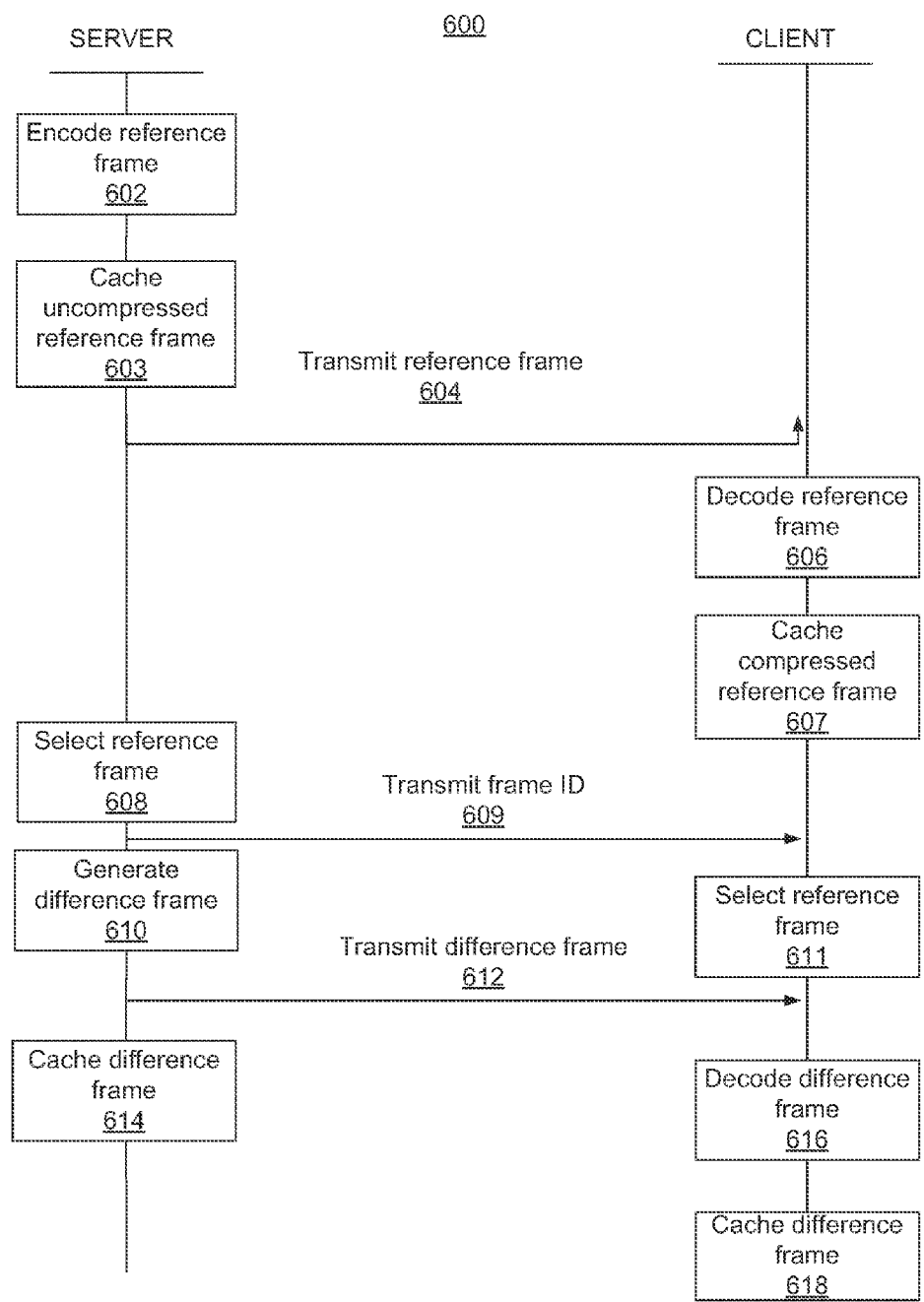
FIG. 6 is an event diagram of a method for updating content associated with a tile, according to one embodiment.

FIG. 6 illustrates an event diagram of a method 600 for updating content associated with a tile, according to one embodiment.

In one embodiment, the video data associated with one or more tiles is compressed using one or more video compression methods, such as video compression methods compliant with the H.264 standard. According to a video compression method, different types of frames are used to communicate data between server and client. This use of different frame types allows for conservation of communication resources when data is communicated between server and client. For example, reference frames, such as I-frames in the H.264 standard, are initially generated 602 to describe video data associated with a tile. A reference frame is self-contained and does not require external data to be decoded and displayed. The server initially generates 602 a reference frame when a tile is generated, providing a baseline description of the video frame or frames associated with the tile. The server then caches 603 an uncompressed version of the reference frame to expedite subsequent retrieval of the reference frame.

The reference frame is then transmitted 604 from server to client, which decodes 606 the reference frames. The client then caches 607 a compressed version of the decoded reference frame in a local cache. This allows the client to locally store a reference frame describing the initial content of each tile. Caching 607 a compressed version of the decoded reference frame allows the client to maximize the number of reference frames locally stored by minimizing the size of each reference frame. The server monitors tile content to detect changes in the tile content and update the client when tile content changes.

As data associated with a tile changes from its initial content, the server selects 608 the reference frame associated with the tile including the changed content and transmits 609 an identifier identifying the tile including the data modifications to the client. As the video decoder included in the client typically includes the most recently received reference frame while the server can update any frame, the server transmits 609 an identifier specifying what frame is to be updated. By transmitting 609 a tile identifier, the server enables the client to select 611 a reference frame associated with the frame that is being updated. In one embodiment, the client selects 611 a reference frame by retrieving the compressed reference frame from a cache, uncompressing the reference frame and decoding the uncompressed reference frame.

While the client is selecting 611 the reference frame associated with the modified frame, the server generates 610 a difference frame associated with the selected 608 tile. The difference frame, such as a P-frame according to the H.264 standard, describes differences between the current tile content and the reference frame associated with the current tile. Hence, the difference frame includes less data than a reference frame by including what has changed between the original tile content and the current tile content. Because of its smaller size, a difference frame can achieve a higher compression rate than a reference frame, reducing communication resources necessary for transmission and storage resources for subsequent storage. However, to decode the difference frame, the corresponding reference frame is accessed and used to determine difference between difference frame content and the content of the original reference frame. Hence, the difference frame itself does not include all data necessary to display the frame.

Because the client caches 607 the reference frame initially associated with each tile, when the server transmits 612 a difference frame, the client uses the difference frame to update tile content using the difference frame and the cached reference frame, which is selected 611, as described above, prior to transmission 612 of the difference frame from server to client. Hence, the client decodes 616 the difference frame using the contents of the difference frame and the contents of the selected reference frame. In an embodiment, the client then caches 618 the difference frame, allowing the client to maintain cached copies of both the original reference frame and the difference frame. The reference frame remains cached as it is used to decode the difference frame and subsequent difference frames, while caching the difference frame allows the client to locally maintain the most recent version of tile content. In another embodiment, the server also caches 614 the difference frame as well as the reference frame associated with the reference frame. In an embodiment, the server uses the difference frame to determine when to generate a new reference frame. An example method for generating a new reference frame is further described below in conjunction with FIG. 7.

Figure 7:
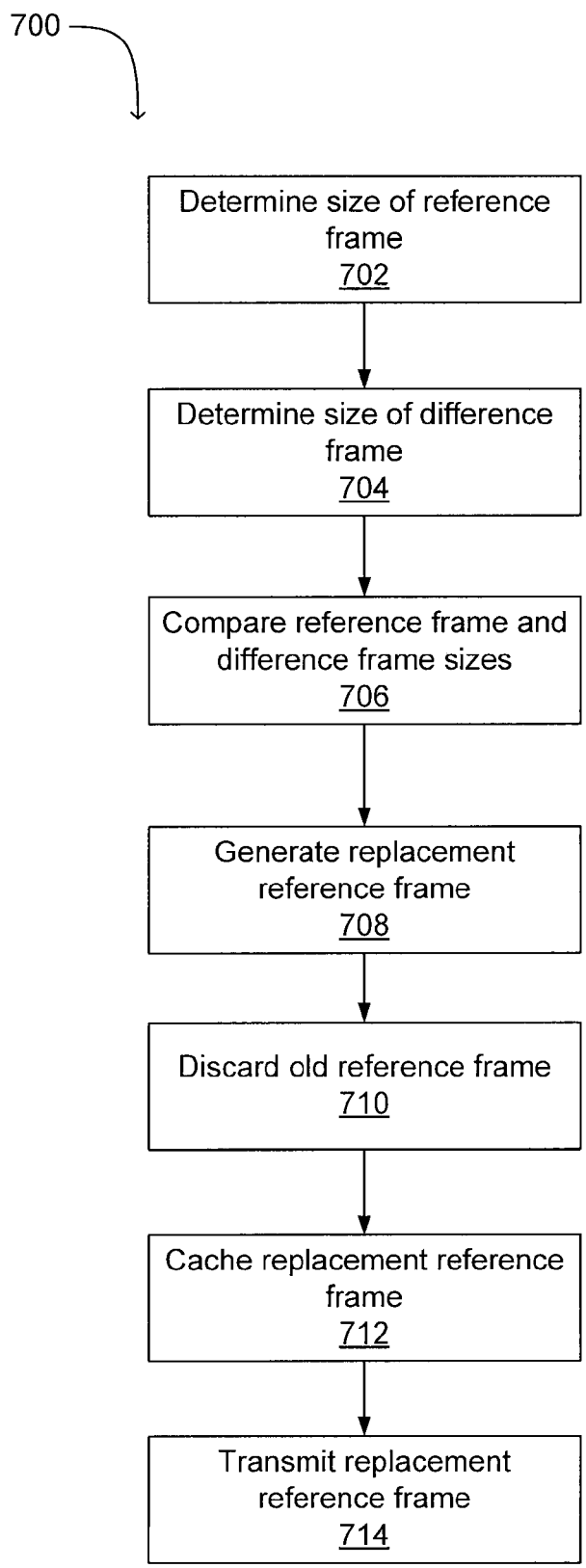
FIG. 7 is an event diagram of a method for a server-initiated update of data describing a tile, according to one embodiment.

FIG. 7 is flowchart of a method 700 for a server-initiated update of data describing a tile, according to one embodiment.

As the server determines when the content of a tile changes and updates, the server also updates the cached reference frames associated with each tile. For example, if the content of a tile is modified so that a minimal amount of the original tile content remains, the server generates a replacement reference frame which describes the new tile content. By replacing reference frames as tiles content changes, the server is able to minimize the data transmitted to the client in difference frames and the storage space needed for difference frames in the cache.

Initially, the storage size used for the reference frame is determined 702 and the storage size used for the difference frame is determined 704. The storage sizes of the reference frame and the difference frame are then compared 706. In an embodiment, the comparison determines whether the difference frame storage equals or exceeds a specified percentage of the reference frame storage size. For example, the comparison determines whether the difference frame storage size is 70% or 100% of the reference frame storage size. In an embodiment, the percentage of the reference frame storage size is predefined to indicate a situation where it is more efficient to store a new reference frame than to determine the changes between the difference file and the reference file. Alternatively, the difference frame storage size is compared 706 to a fixed size threshold specifying a maximum size for efficient handling of difference frames.

If the comparison 706 determines that the difference frame storage size equals or exceeds the percentage of the reference frame storage size or the fixed size threshold, a replacement reference frame is generated 708 to describe the current contents of the tile. After generating 708 the replacement reference frame, the previously cached reference frame is discarded 710. The replacement reference frame is then cached 712, so that subsequent tile content updates are made with respect to the replacement reference frame rather than the original reference frame. Further, the replacement reference frame is then transmitted 714 from the server to the client, allowing the client to locally cache the replacement reference frame. Hence, this allows the client to also use the replacement reference frame when evaluating subsequent modifications to tile content.

Figure 8:
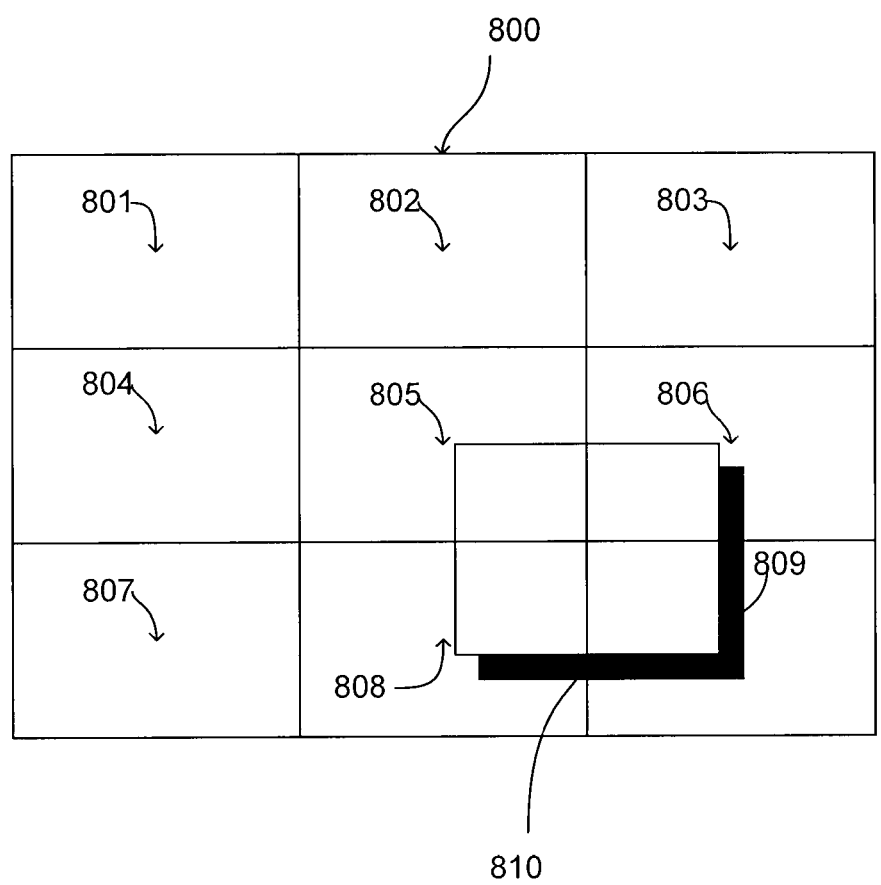
FIG. 8 is an example implementation of a method for transmitting video data from a server to a client, according to one embodiment.

FIG. 8 shows an example implementation of a method for transmitting video data from a server to a client, according to one embodiment.

The client UI viewport 810 identifies the portion of a web page shown on a client display device. The client UI viewport 810 has dimensions equal, or substantially equal, to the physical size of the client display device. Hence, the client UI viewport 810 identifies the portion of a web page or other data that is visible to a user at a particular time. As shown in FIG. 8, the client UI viewport 810 only displays a subset of the web page 800 being viewed. However, a client user may reposition the client UI viewport 810 to view a different subset of the web page 800. As one or more video frames are used to transmit the web page 800 from server to client, transmitting portions of the web page 800 from the server when the client UI viewport 810 heavily taxes communication resources between the server and client.

To conserve communication resources, the server initially partitions the web page into a plurality of tiles 801-809. In an embodiment, each tile 801-809 has a dimension equal to the client UI viewport dimension rounded up to be divisible by 16. The tiles 801-809 are in fixed locations, allowing the client to reconstruct the web page 800 from the plurality of tiles 801-809 based on index values describing one or more tiles 801-809 adjacent to a displayed tile 801-809. The server communicates tiles 801-809 to the client according to a pre-defined schedule. For example, tile 805 is initially transmitted and associated with the client UI viewport 810. The server then communicates tiles 806, 808 and 809 to the client so that tiles adjacent to the tile 805 associated with the client UI viewport 810 are locally stored on the client device. This allows the client to retrieve tiles 806, 808 and 809 from a local cache, reducing the amount of time needed to display the content of tiles 806, 808, 809 in the client UI viewport 810.

As the client UI viewport 810 is repositioned, the client requests, and receives, tiles 801-809 from the server or a local cache corresponding to the position of the client UI viewport. To conserve communication resources, compressed video data associated with the tiles not associated with the client UI viewport 810 is received while uncompressed video data is received for the tile or tiles associated with the client UI viewport 810.

Figure 10:
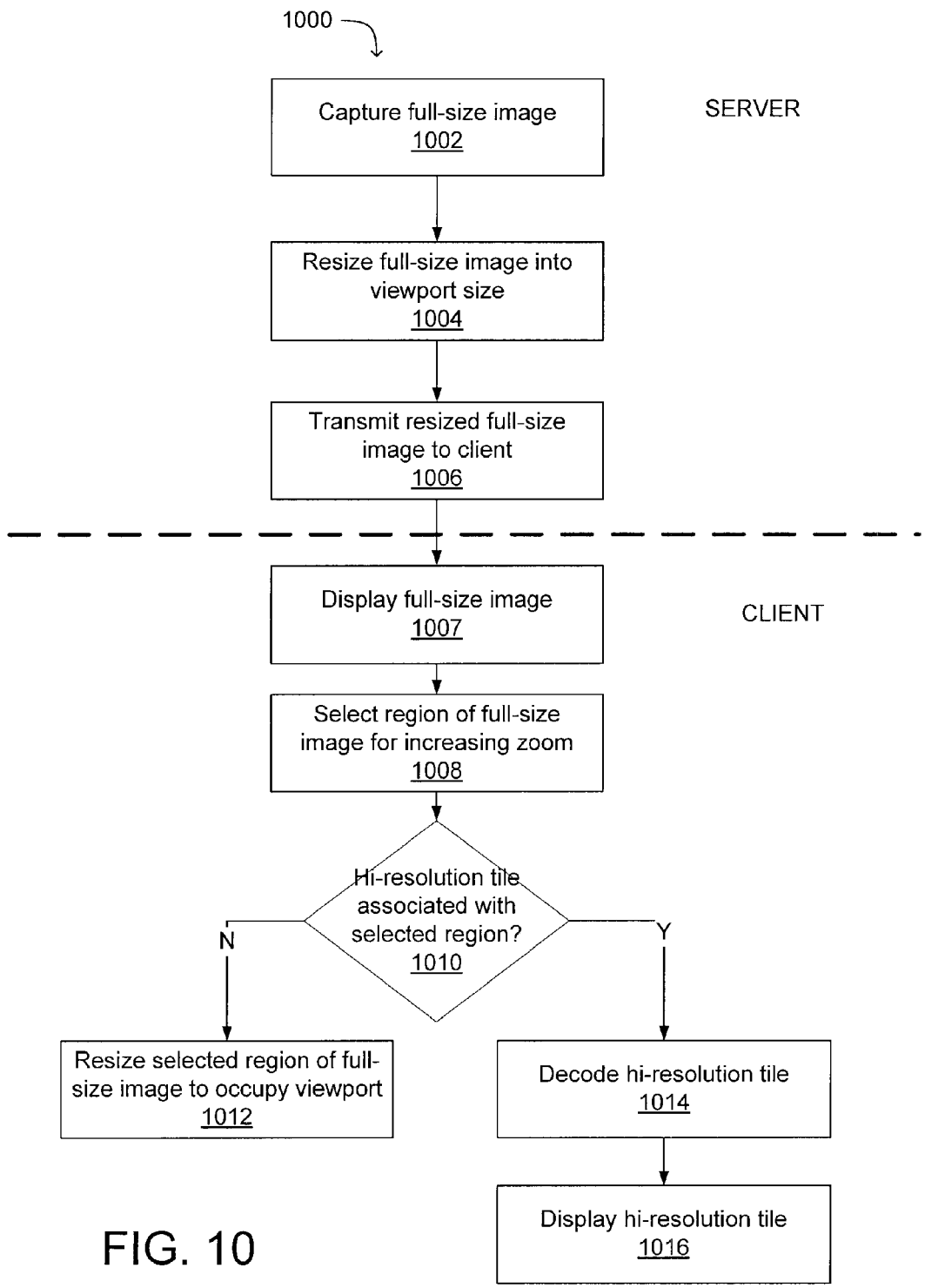
FIG. 10 is a flowchart of a method for transmitting high-resolution and low-resolution video data from a server to a client, according to one embodiment.

FIG. 10 is a flowchart of a method 1000 for transmitting high-resolution and low-resolution video data from a server to a client, according to one embodiment. The method 1000 is implemented in conjunction with the method 500 described above in conjunction with FIG. 5.

In the previously-described method, previously-described tiles include the maximum amount of information about tile content, allowing for the best display resolution by the client device. In an embodiment, each pixel in the previously-described tiles corresponds to a pixel in a client display device. Alternatively, the previously-described tiles include data associated with content which allows the client to generate a high-resolution display of the content associated with the tiles. Because of this, tiles including data for generation of a high-resolution display by the client are referred to as "hi-resolution tiles." Hence, the hi-resolution tiles include an increased amount of data used to display tile content, and can include the maximum amount of data associated with a tile. However, the hi-resolution tile can only include data describing a limited amount of content for display, for example, the hi-resolution tile can only communicate data describing a 320 pixel by 320 pixel segment of the content. Because of the limited amount of data included in a hi-resolution tile, it is not practical to use only hi-resolution tiles to communicate content, such as a web page, to the client. Use of only hi-resolution tiles would require a large number of communications between client and server as each hi-resolution tile merely describes a small portion of the overall content for display by the client.

In an embodiment, low-resolution tiles are also used to reduce the number of transmissions between client and server and allow a client user to quickly view a complete version of the content for display. These low-resolution tiles allow the server to transmit data describing a larger amount of the content for display by the server. For example, a low-resolution tile is used to communicate an overview of a complete web page to the client. This allows a user of the client to view the entire content and select a region from the overall content display of particular interest.

Initially, a full-size image of the content is captured 1002 by the server. For example, the full-size image describes a complete web page, a complete text file or other data for display. In an embodiment, this full-size image comprises a 960 pixel by 960 pixel image of the content. However, the client viewport is limited to displaying a smaller-size image, such as a 320 pixel by 320 pixel image. To display the full-size image on the client, the server resizes 1004 the full-size image to fit into a 320 pixel by 320 pixel display, generating a low-resolution tile which includes complete content for display. In an embodiment, the full-size image is resized 1004 by changing the zoom ratio associated with the full-size image. For example, the zoom ratio associated with the full-size image is modified from 1:1 to 1:3, resulting in a resized image that is reduced by a factor of 3, allowing the complete full-size image to be viewed in the client viewport.

The resized image is transmitted 1006 from server to client. The client the caches the resized image and displays 1007 the resized image. A user then selects 1008 a region of the resized image for viewing in greater detail. This user selection 1008 determines a portion of the content to be viewed in greater detail. The client then determines 1010 whether a hi-resolution tile associated with the selected region is locally cached.

If the client does not have a hi-resolution tile associated with the selected region cached, the selected portion of the resized image is resized 1012 to occupy the client UI viewport. For example, the client modifies the zoom ratio associated with the selected region from 1:3 to 1:1 or to another value so that the selected portion of the resized image occupies the majority of the client UI viewport. This allows the client to display a lower resolution version of the selected region while hi-resolution tiles associated with the selected region.

If the client includes one or more hi-resolution tiles associated with the selected region, the hi-resolution tile or tiles are retrieved from the client cache and decoded 1014 then displayed 1016. Hence, the client displays 1016 an increased resolution image corresponding to the selected region, allowing a client user to view the selected region in greater detail. Hence, the combination of hi-resolution and low-resolution tiles allows the client to display different versions of the content, a high-resolution version and a low-resolution version, and allows a client user to alternate between the high-resolution version and low-resolution version.

Figure 11:
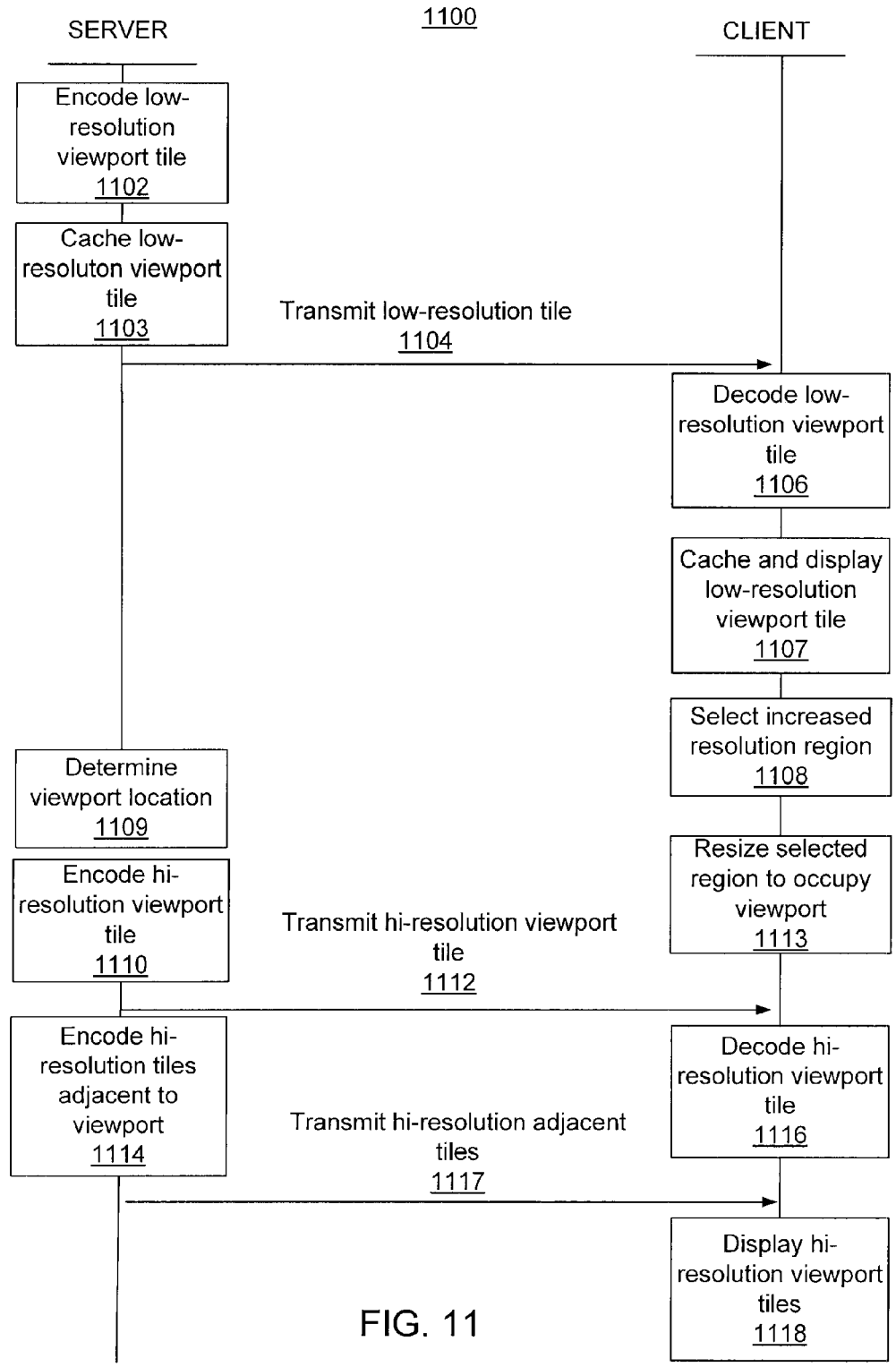
FIG. 11 illustrates an event diagram of a method for displaying content using low-resolution and hi-resolution tiles, according to one embodiment.

FIG. 11 illustrates an event diagram of a method 1100 for displaying content using low-resolution and hi-resolution tiles, according to one embodiment.

In one embodiment, the server initially encodes 1102 and caches 1103 a low-resolution tile associated with the client UI viewport. The low-resolution tile is then transmitted 1104 to the client where it is decoded 1106, cached and displayed 1107 in the client UI viewport. This allows a client user to quickly see an overview of the complete content described by the low-resolution tile. Hence, the client user can view the content without requiring the client to receive hi-resolution tiles corresponding to all regions of the content.

A client user then selects 1108 a region of the content to view more closely. For example, the client user selects 1108 a region of a web page, text file or video to view in the client UI viewport. This change in client UI viewport position is determined 1109 by the server, which then begins updating the tiles associated with the new client UI viewport position. In an embodiment, the client transmits to the server an identifier describing the selected region and a zoom level, allowing the server to determine the selected region and use the zoom level to determine a resolution level for the high-resolution tile or high-resolution tiles associated with the selected region. However, as the server is updating tiles associated with the new client UI viewport position, the client resizes 1113 the selected region of the low-resolution viewport image to occupy the viewport. Hence, the client UI viewport displays a low-resolution version of the selected region of the content, allowing the client user to begin viewing the selected region even before hi-resolution tiles associated with the selected region are received. Essentially, the resized low-resolution viewport image acts as a placeholder of the selected region until the client decodes high-resolution tiles associated with the selected region.

After the server determines 1109 the client UI viewport location, the server encodes 1110 one or more high-resolution tiles, for example, as described above with respect to FIG. 6. The hi-resolution viewport tile is then transmitted 1112 from the server to the client. The client then decodes 1116 and displays 1118 the hi-resolution viewport tile in the client display device. Hence, the client user is initially shown a low-resolution version of the desired content region generated from the low-resolution viewport tile of the complete content. This low-resolution version is then replaced by hi-resolution content after the server determines 1109 the client UI viewport location and transmits 1112 the hi-resolution tile, or tiles, associated with the client UI viewport location. Hence, the client user is able to navigate and view a complete web page, text file or other content without requiring the server to transmit hi-resolution tiles associated with each region of the content.

The server also encodes 1114 one or more hi-resolution tiles adjacent to the client UI viewport location and transmits 1117 these additional hi-resolution tiles to the client UI viewport location to the client for decoding and caching. This allows the client to locally cache tiles adjacent to the current client UI viewport location. Locally storing these adjacent tiles allows the client to quickly retrieve hi-resolution tiles associated with content most likely to be subsequently accessed by the user. Hence, the client and server use a combination of hi-resolution tiles and low-resolution tiles to allow a client user to navigate view and navigate different content.

Figure 12:
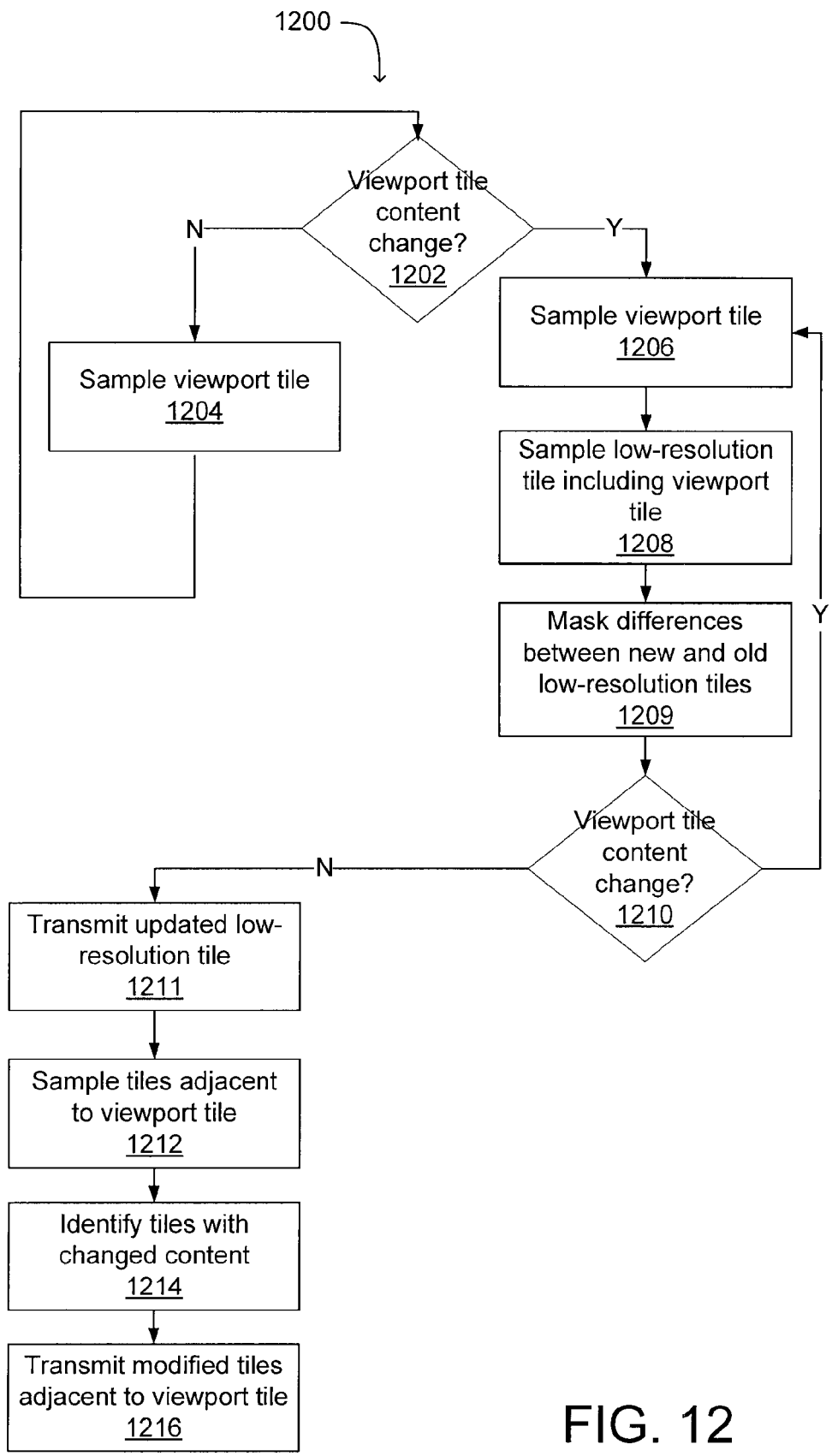
FIG. 12 illustrates a method for server updating of high-resolution tile content and low-resolution tile content.

FIG. 12 illustrates a method 1200 for server updating of high-resolution tile content and low-resolution tile content.

Initially, the server determines 1202 whether the content of the tile associated with the client UI viewport tile changes. In an embodiment, the server compares the current version of the content to a most recently sampled version of the content to determine 1202 changes in the content. As the tile associated with the client UI viewport tile is being viewed by a client user, it is most frequently monitored for content changes so the client user is viewing the most recent content. Hence, the server samples the content associated with the tile associated with the client UI viewport as often as possible, making the tile associated with the client UI viewport best suited for determining when content changes.

If the tile associated with the client UI viewport does not change, the tile associated with the client UI viewport is again sampled 1204. This sampling 1204 allows for continuous determination of changes to content being displayed to a client user.

If the tile associated with the client UI viewport does change, the tile associated with the client UI viewport is also sampled 1206 and a low-resolution tile which includes the tile associated with the client UI viewport is also sampled 1208. For example, the low-resolution tile comprises an image of a web page including the region displayed in the client UI viewport. This additional sampling of the low-resolution tile updates the content associated with the low-resolution tile to reflect the current low-resolution tile contents; hence, subsequent samples of the low-resolution tile including the tile associated with the client UI viewport are compared to the most recently sampled low-resolution tile.

Differences between the original low-resolution tile and currently-sampled low-resolution tile are then masked 1209. In an embodiment, masking 1209 denotes regions of the low-resolution tile that have changed with shading, such as a gray box, or another visual indicator. Hence, the most recently-sampled low-resolution tile identifies both current content and identifies regions that have been modified from the original low-resolution tile. In an embodiment, the newly-sampled low-resolution tile with is transmitted from the server to the client.

After sampling the low-resolution tile, it is again determined 1210 whether the content associated with the tile associated with the client UI viewport is changing. If the content associated with the tile associated with the client UI viewport is still changing, the tile associated with the client UI viewport is again sampled 1206 and the low-resolution tile including the tile associated with the client UI viewport is also sampled 1208 again. Regions of the low-resolution tile which have changed since the most-recently sampled low-resolution tile are masked 1209 so that the most-recently sampled low-resolution tile identifies regions that have changed or are changing. In an embodiment, the low-resolution tile visually distinguishes the changing regions of the low-resolution tile from static regions of the low-resolution tile. In an embodiment, the low-resolution tile includes a colored polygon, an image or an animation associated with a changing region of the low-resolution tile. For example, the low-resolution tile displays one or more gray rectangles associated with one or more changing regions of the low-resolution tile. The most-recently sampled low-resolution tile is then sent to the client so that the client locally caches a description of the changing regions of the low-resolution tile.

Further, locally caching the most recently sampled low-resolution tile with the changing regions masked improves content navigation on the client. For example, if the client user repositions the viewport to a region in the low-resolution tile that is masked as currently changed, the gray rectangle or other visual indicator is displayed to the user. Hence, rather than display old data to the user, the client displays a visual indication, such as a colored polygon, an image or an animation, that the user-selected region has been modified since it was cached.

If it is determined 1210 that the tile associated with the client UI viewport is no longer changing, an updated low-resolution tile is transmitted 1211 to the client. This updated low-resolution tile includes the most recent data associated with the various regions of the low-resolution tile. Hence, this updated low-resolution area replaces the masked regions with the current data, allowing the user to view the current data. For example, the updated low-resolution tile replaces gray rectangles from the masking 1209 with recent content associated with the masked region.

Further, tiles adjacent to the tile associated with the client UI viewport are sampled 1212. These samples are used to identify 1214 tiles adjacent to the tile associated with the client UI viewport including content that has changed since the tiles were initially cached by the client. Hence, when the content is no longer changing ("in a steady state"),updated content, both low-resolution and high resolution is transmitted 1216 from server to client, allowing the client to locally cache the current content associated with the various tiles.

Figure 9:
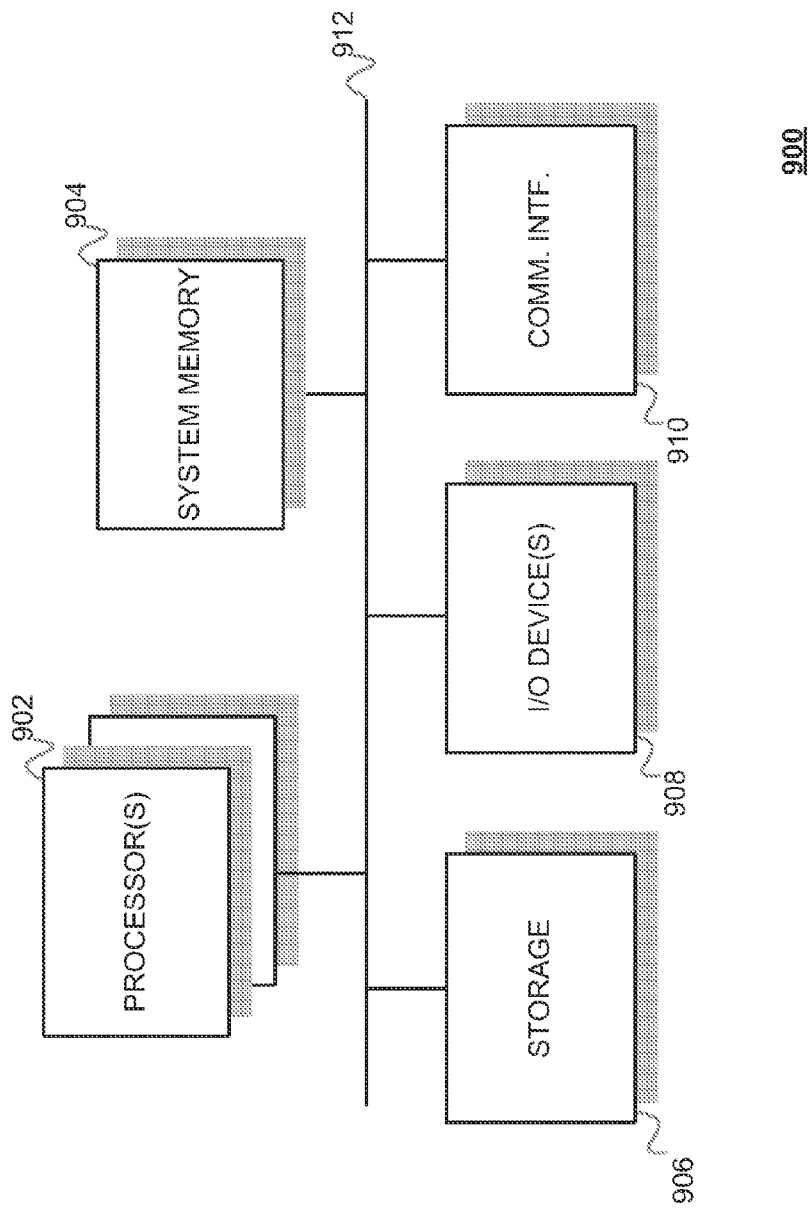
FIG. 9 is a block diagram of an example computer system suitable for use in association with a client-server architecture for communicating video data, according to one embodiment.

FIG. 9 illustrates an example computer system suitable for use in association with a client-server architecture for remote interaction, according to one embodiment. As shown, computer system 900 may represent either a computer operating as a server, or a computer operating as a client, with the general components illustrated in FIG. 9 potentially varying with each respective representation, as would be appreciated by one of skill in the art. Computer system 900 may include one or more processors 902 and may include system memory 904. Additionally, computer system 900 may include storage 906 in the form of one or more devices (such as a hard drive, an optical or another type of disk, electronic memory, including flash memory, and so forth), input/output devices 908 (as a keyboard (screen-based or physical, in a variety of forms), scroll wheels, number pads, stylus-based inputs, a touchscreen or touchpad, etc.) and communication interfaces 910 (to connect to a LAN, a WAN, a wired or wireless network, and so forth). The elements may be coupled to each other via system bus 912, which may represent one or more buses. In the case where system bus 912 represents multiple buses, the multiple buses may be bridged by one or more bus bridges (not shown). When representing client devices in some embodiments, processor(s) 902 may comprise a controller, and system memory 904 and storage 906 may comprise one cohesive memory component.

These elements each perform their conventional functions known in the art. In various embodiments, computing system 900 may at least be partially incorporated in a larger computing system. System memory 904 and storage 906 may be employed to store a working copy and a permanent copy of the programming instructions implementing various aspects of the one or more earlier described embodiments of the present invention. Any software portions described herein need not include discrete software modules. Any software configuration described above is meant only by way of example; other configurations are contemplated by and within the scope of various embodiments of the present invention. The term, engine, is used herein to denote any software or hardware configuration, or combination thereof, that performs the function or functions referenced.

With respect to some embodiments of the invention, modules have been described to implement various functions. In alternate embodiments, part or all of the modules may be implemented in hardware, for example, using one or more Application Specific Integrated Circuits (ASICs) instead.

In all of the foregoing, it is appreciated that such embodiments are stated only for the purpose of example, and that other embodiments could equally be provided without departing from the essential characteristics of the present invention.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely by way of example, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to a system for performing the operations herein. This system may be specially constructed for the required purposes, or it may include a computer (including any type of computer, depending on various embodiments, including a server, personal computer, tablet device, handheld computer, PDA, cellular phone, etc.) selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs, including multi-core designs, for increased computing capability.

The algorithms and operations presented herein are not inherently related to any particular computer or other system. Various general-purpose systems may also be used with programs in accordance with the teachings herein, or it may prove convenient to construct more specialized system to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein.

The present invention is well suited to a wide variety of computer network systems over numerous topologies. Within this field, the configuration and management of large networks include storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for communicating content across a network using video frames, the method comprising:
    partitioning the content into a plurality of tiles, each tile including a subset of the content and index data describing a relationship between a tile and one or more adjacent tiles;
    encoding the content associated with each tile in the plurality of tiles as a reference frame;
    transmitting the plurality of encoded tiles to a client to allow the client to combine the plurality of encoded tiles using the index data;
    responsive to a modification to the content associated with a tile, generating a difference frame, the difference frame describing the modification to the content associated with the tile in relation to the reference frame;
    comparing a storage size of the difference frame to a threshold specifying a maximum storage size of the difference frame;
    responsive to the storage size of the difference frame being less than the threshold, transmitting the index data of the tile whose content has been modified and the difference frame to the client, the client configured to combine the difference frame with the reference frame associated with the tile identified by the index data; and
    responsive to the storage size of the difference frame being greater than the threshold,
        generating a replacement reference frame, the replacement reference frame including the modified content associated with the tile, and
        transmitting the index data of the tile whose content has been modified and the replacement reference frame to the client to allow the client to combine the replacement reference frame with one or more of the plurality of encoded tiles using the index data.

2. The method of claim 1, wherein the index data further comprises a tile identifier, a tile height and width, or clipping data, the clipping data describing editing of the content to not exceed the tile height and width.

3. The method of claim 1, wherein partitioning the content into a plurality of tiles comprises:
    segmenting the content into a grid, the grid comprising a plurality of tiles having a fixed height and width and each tile adjacent to one or more surrounding tiles.

4. The method of claim 1, further comprising:
    caching the reference frame associated with each tile in the plurality of tiles.

5. The method of claim 1, further comprising:
    caching the difference frame and the index data associating the difference frame with the reference frame including the modification to content.

6. A non-transitory computer-readable storage medium configured to store instructions for communicating content across a network using video frames, the instructions when executed by a processor causing the processor to:
    partition the content into a plurality of tiles, each tile including a subset of the content and index data describing a relationship between a tile and one or more adjacent tiles;
    encode the content associated with each tile in the plurality of tiles as a reference frame;
    transmit the plurality of encoded tiles to a client to allow the client to combine the plurality of encoded tiles using the index data;
    responsive to a modification to the content associated with a tile, generate a difference frame, the difference frame describing the modification to the content associated with the tile in relation to the reference frame;
    compare a storage size of the difference frame to a threshold specifying a maximum storage size of the difference frame;
    responsive to the storage size of the difference frame being less than the threshold, transmit the index data of the tile whose content has been modified and the difference frame to the client, the client configured to combine the difference frame with the reference frame associated with the tile identified by the index data; and
    responsive to the storage size of the difference frame being greater than the threshold,
        generate a replacement reference frame, the replacement reference frame including the modified content associated with the tile, and
        transmit the index data of the tile whose content has been modified and the replacement reference frame to the client to allow the client to combine the replacement reference frame with one or more of the plurality of encoded tiles using the index data.

7. The non-transitory computer-readable storage medium of claim 6, wherein the index data further comprises a tile identifier, a tile height and width, or clipping data, the clipping data describing editing of the content to not exceed the tile height and width.

8. The non-transitory computer-readable storage medium of claim 6, wherein the instructions that when executed cause the processor to partition the content into a plurality of tiles further comprises instructions that when executed cause the processor to segment the content into a grid, the grid comprising a plurality of tiles having a fixed height and width and each tile adjacent to one or more surrounding tiles.

9. The non-transitory computer-readable storage medium of claim 6, further comprising instructions that when executed cause the processor to cache the reference frame associated with each tile in the plurality of tiles.

10. The non-transitory computer-readable storage medium of claim 6, further comprising instructions that when executed cause the processor to cache the difference frame and the index data associating the difference frame with the reference frame including the modification to content.

11. A system for communicating content across a network using video frames, the system comprising:
    a processor configured to execute computer program instructions; and
    a non-transitory computer readable storage medium storing the computer program instructions executable by the processor, the instructions for:
        partitioning the content into a plurality of tiles, each tile including a subset of the content and index data describing a relationship between a tile and one or more adjacent tiles;
        encoding the content associated with each tile in the plurality of tiles as a reference frame;
        transmitting the plurality of encoded tiles to a client to allow the client to combine the plurality of encoded tiles using the index data;
        responsive to a modification to the content associated with a tile, generating a difference frame, the difference frame describing the modification to the content associated with the tile in relation to the reference frame;
        comparing a storage size of the difference frame to a threshold specifying a maximum storage size of the difference frame;

responsive to the storage size of the difference frame being less than the threshold, transmitting the index data of the tile whose content has been modified and the difference frame to the client, the client configured to combine the difference frame with the reference frame associated with the tile identified by the index data; and responsive to the storage size of the difference frame being greater than the threshold:
- generating a replacement reference frame, the replacement reference frame including the modified content associated with the tile, and
- transmitting the index data of the tile whose content has been modified and the replacement reference frame to the client to allow the client to combine the replacement reference frame with one or more of the plurality of encoded tiles using the index data.

12. The system of claim 11, wherein the index data further comprises a tile identifier, a tile height and width, or clipping data, the clipping data describing editing of the content to not exceed the tile height and width.

13. The system of claim 11, wherein the instructions for partitioning the content into a plurality of tiles further comprises instructions for segmenting the content into a grid, the grid comprising a plurality of tiles having a fixed height and width and each tile adjacent to one or more surrounding tiles.

14. The system of claim 11, further comprising instructions for caching the reference frame associated with each tile in the plurality of tiles.

15. The system of claim 11, further comprising instructions for caching the difference frame and the index data associating the difference frame with the reference frame including the modification to content.

* * * * *